US012744175B2

(12) United States Patent
Kim et al.

(10) Patent No.: US 12,744,175 B2
(45) **Date of Patent: *Sep. 22, 2026**

(54) ARC PATH FORMATION UNIT AND DIRECT CURRENT RELAY COMPRISING SAME

(71) Applicant: LS ELECTRIC CO., LTD., Anyang-si (KR)

(72) Inventors: Ha Su Kim, Anyang-si (KR); Jin Hee Park, Anyang-si (KR); Young Jun Son, Anyang-si (KR)

(73) Assignee: LS ELECTRIC CO., LTD., Anyang-si (KR)

( * ) Notice: Subject to any disclaimer, the term of this patent is extended or adjusted under 35 U.S.C. 154(b) by 337 days.

This patent is subject to a terminal disclaimer.

(21) Appl. No.: 18/682,364

(22) PCT Filed: Nov. 14, 2022

(86) PCT No.: PCT/KR2022/017906

§ 371 (c)(1),
(2) Date: Feb. 8, 2024

(87) PCT Pub. No.: WO2023/090788

PCT Pub. Date: May 25, 2023

(65) Prior Publication Data

US 2024/0355567 A1 Oct. 24, 2024

(30) Foreign Application Priority Data

Nov. 18, 2021 (KR) ........................ 10-2021-0159316

(51) Int. Cl.
*H01H 50/60* (2006.01)
*H01H 9/44* (2006.01)
*H01H 50/38* (2006.01)

(52) U.S. Cl.
CPC ............ *H01H 50/60* (2013.01); *H01H 9/443* (2013.01); *H01H 50/38* (2013.01)

(58) Field of Classification Search
CPC ........ H01H 50/60; H01H 9/443; H01H 50/38; H01H 50/045; H01H 50/16; H01H 50/54; H01H 50/546
(Continued)

(56) References Cited

U.S. PATENT DOCUMENTS 8,674,796 B2 * 3/2014 Ito ............................ H01H 9/44 335/133
9,336,965 B2 * 5/2016 Yano ...................... H01H 9/443
9,412,545 B2 * 8/2016 Kubono ................. H01H 50/60
9,748,065 B2 * 8/2017 Shima .................... H01H 50/54
(Continued)

FOREIGN PATENT DOCUMENTS

CN 201985041 U 9/2011
CN 104882336 A 9/2015
(Continued)

OTHER PUBLICATIONS

Notice of Allowance for related Japanese Application No. 2024-508439; action dated Apr. 30, 2025; (3 pages).
(Continued)

*Primary Examiner* — Shawki S Ismail
*Assistant Examiner* — Lisa N Homza
(74) *Attorney, Agent, or Firm* — K&L Gates LLP

(57) ABSTRACT

The present disclosure discloses an arc path formation unit and a direct current relay including the same, which can effectively guide a generated arc to the outside, including a magnet holder unit disposed between the outside of an arc chamber and the inside of a frame and including a first holder and a second holder different from each other; and a magnet unit attached to one surface of the magnet holder unit facing the arc chamber and forming a magnetic field in the arc chamber, wherein the first holder and the second holder are each bent at a predetermined angle and extended, the magnet unit is attached to both ends thereof, and a magnetic field formed in the magnet unit forms an electro-
(Continued)

1 magnetic force together with the electric current energizing through the direct current relay to guide the arc in a direction away from a fixed contact.

18 Claims, 20 Drawing Sheets

(58) Field of Classification Search
USPC ........................................................... 335/78
See application file for complete search history.

(56) References Cited

U.S. PATENT DOCUMENTS

| | | | | |
|---|---|---|---|---|
| 10,892,125 | B2 * | 1/2021 | Minowa | H01H 50/045 |
| 2013/0240495 | A1 * | 9/2013 | Yano | H01H 9/443 219/123 |
| 2015/0054605 | A1 * | 2/2015 | Kubono | H01H 9/443 335/177 |
| 2020/0126741 | A1 * | 4/2020 | Lee | H01H 9/443 |
| 2021/0151269 | A1 * | 5/2021 | Hoffmann | H01H 33/22 |
| 2021/0335565 | A1 * | 10/2021 | Kawaguchi | H01H 50/38 |

FOREIGN PATENT DOCUMENTS

| | | | | |
|---|---|---|---|---|
| CN | 109659197 | A | 4/2019 | |
| CN | 112908754 | * | 3/2021 | H01H 9/443 |
| CN | 112908754 | A | 6/2021 | |
| JP | 2012104364 | A | 5/2012 | |
| KR | 101216824 | B1 | 12/2012 | |
| KR | 20130079045 | A | 7/2013 | |
| KR | 20170008047 | A | 1/2017 | |
| KR | 1020210007391 | A | 1/2021 | |
| KR | 1020210025959 | A | 3/2021 | |
| WO | 2021149361 | A1 | 7/2021 | |

OTHER PUBLICATIONS

Office Action for related Japanese Application No. 2024-508439; action dated Jan. 28, 2025; (5 pages).
International Search Report for related International Application No. PCT/KR2022/017906; action dated May 25, 2023; (2 pages).
Written Opinion for related International Application No. PCT/KR2022/017906; action dated May 25, 2023; (4 pages).

* cited by examiner

ARC PATH FORMATION UNIT AND DIRECT CURRENT RELAY COMPRISING SAME

CROSS-REFERENCE TO RELATED APPLICATION

This application is a National Stage of International Application No. PCT/KR2022/017906, filed on Nov. 14, 2022, which claims priority to and the benefit of Korean Patent Application No. 10-2021-0159316, filed on Nov. 18, 2021, the disclosures of which is incorporated herein by reference in its entirety.

FIELD

The present disclosure relates to an arc path formation unit and a direct current relay including the same, and more particularly, to an arc path formation unit having a structure capable of effectively guiding a generated arc to the outside, and a direct current relay including the same.

BACKGROUND

A direct current relay refers to a device that transmits a mechanical drive or current signal using the principle of an electromagnet. The direct current relay is also called an electromagnetic switch, and is generally classified as an electrical circuit switching device.

The direct current relay includes a fixed contact and a movable contact. The fixed contact is energizably connected to an external power source and load. The fixed contact and the movable contact may be in contact with each other or spaced apart from each other.

By contact and separation between the fixed contact and the movable contact, energization through the direct current relay is allowed or blocked. The movement is achieved by a driving unit that applies a driving force to the movable contact.

When the fixed contact and the movable contact are spaced apart, an arc is generated between the fixed contact and the movable contact. An arc is a flow of high-voltage, high-temperature current. Therefore, the generated arc must be quickly discharged from the direct current relay through a predetermined path.

The discharge path of the arc is formed by a magnet provided in the direct current relay. The magnet forms a magnetic field inside a space where the fixed contact and the movable contact are in contact with each other. The discharge path of the arc may be formed by the electromagnetic force generated by the formed magnetic field and current flow.

In a conventional direct current relay, the electromagnetic force acting on some fixed contacts is formed toward the inside, that is, toward the central part of the movable contacts. Therefore, the arc generated at the corresponding location cannot be immediately discharged to the outside.

In the central part of the direct current relay, that is, the space between each fixed contact, several members are provided to drive the movable contact in the up-down direction. For example, a shaft, a spring member inserted through the shaft, and the like are provided at the above position.

Therefore, if the arc generated is moved toward the central part, and if the arc moved to the central part is not immediately moved to the outside, there is a concern that several members provided at the position may be damaged by the energy of the arc.

In addition, the direction of the electromagnetic force formed inside a conventional direct current relay depends on the direction of the electric current flowing through the fixed contact. That is, the position of the electromagnetic force formed in the inward direction among the electromagnetic forces generated at each fixed contact differs depending on the direction of the electric current.

That is, the user must consider the direction of the electric current whenever using the direct current relay. This may cause inconvenience in use of the direct current relay. In addition, regardless of the user's intention, a situation in which the direction of the electric current applied to the direct current relay is changed due to inexperienced operation cannot be excluded.

In this case, members provided in the central part of the direct current relay may be damaged by the generated arc. Accordingly, the durability period of the direct current relay may be reduced, and safety accidents may occur.

Korean Patent Registration No. 10-1696952 discloses a direct current relay. Specifically, it discloses a direct current relay with a structure capable of preventing movement of a movable contact by using a plurality of permanent magnets.

However, although this type of direct current relay can prevent movement of the movable contact by using a plurality of permanent magnets, there is a limitation in that there is no consideration for a method for controlling the direction of an arc discharge path.

Korean Patent Registration No. 10-1216824 discloses a direct current relay. Specifically, it discloses a direct current relay with a structure capable of preventing any separation between a movable contact and a fixed contact by using a damping magnet.

However, this type of direct current relay only proposes a method for maintaining the contact state between the movable contact and the fixed contact. That is, there is a limitation in that a method for forming a discharge path of an arc generated when the movable contact and the fixed contact are separated is not proposed.

(Patent Document 1) Korean Patent Registration No. 10-1696952 (2017.01.16.)

(Patent Document 2) Korean Patent Registration No. 10-1216824 (2012.12.28.)

SUMMARY

The present disclosure is directed to providing an arc path formation unit capable of quickly extinguishing and discharging an arc generated as the energized electric current is cut off, and a direct current relay including the same.

The present disclosure is also directed to providing an arc path formation unit that can strengthen the magnitude of force for guiding a generated arc and a direct current relay including the same.

The present disclosure is also directed to providing an arc path formation unit that can prevent damage to components for energizing due to a generated arc, and a direct current relay including the same.

The present disclosure is also directed to providing an arc path formation unit through which arcs generated at a plurality of positions can proceed without meeting each other, and a direct current relay including the same.

The present disclosure is also directed to providing an arc path formation unit and a direct current relay including the same that can achieve the above-described objects without excessive design changes.

In order to achieve the above objects, the arc path formation unit according to an embodiment of the present disclosure includes: an arc chamber in which a plurality of fixed contacts and movable contacts are accommodated; a magnet holder unit disposed outside the arc chamber and comprising a first holder and a second holder that are different from each other; and a magnet unit attached to one surface of the magnet holder unit facing the arc chamber and forming a magnetic field in the arc chamber, wherein the first holder and the second holder are each bent and extended at a predetermined angle, are spaced apart from each other and are arranged in a direction parallel to the arrangement direction of the plurality of fixed contacts, and are arranged such that their respective concave portions face each other, wherein the magnet unit includes: a first magnet and a second magnet disposed adjacent to one surface of the first holder facing the arc chamber and extending from one end or the other end of the first holder along the one surface of the first holder; and a third magnet and a fourth magnet disposed adjacent to one surface of the second holder facing the arc chamber and extending from one end or the other end of the second holder along the one surface of the second holder, and wherein the first magnet, the second magnet, the third magnet and the fourth magnet are all magnetized with the same polarity.

In addition, in the magnet unit, the first magnet and the third magnet may be arranged to face each other, and the second magnet and the fourth magnet may be arranged to face each other.

In addition, the first magnet may extend in a direction parallel to an extension direction of the third magnet, and the second magnet may extend in a direction parallel to an extension direction of the fourth magnet.

In addition, the first magnet and the second magnet may have their respective extension directions intersecting each other.

In addition, the first magnet may be arranged to face the second magnet each other, with a virtual line extending along the arrangement direction of the fixed contact interposed therebetween, and the third magnet may be arranged to face the fourth magnet each other with the virtual line interposed therebetween.

In addition, in the magnet unit, a shortest distance between the first magnet and the second magnet may be formed to be equal to a shortest distance between the third magnet and the fourth magnet.

In addition, the arc path formation unit may further include an auxiliary magnet that overlaps a central point of the plurality of fixed contacts in a movement direction of the movable contact and forms a magnetic field in the arc chamber.

In addition, the auxiliary magnet may have an extension direction parallel to the arrangement direction of the first holder and the second holder.

In addition, the auxiliary magnet may have an extension direction that intersects the arrangement direction of the first holder and the second holder.

In addition, the first magnet, the second magnet, the third magnet, and the fourth magnet may have lengths in the width direction and breadth direction, respectively, corresponding to each other.

In addition, the first holder may be formed in a shape corresponding to the second holder, and be symmetrical to the second holder with respect to a central point of the plurality of fixed contacts.

In addition, the present disclosure provides a direct current relay, including: a plurality of fixed contacts spaced apart from each other in one direction; a movable contact that is in contact with or spaced apart from the fixed contact; an arc chamber in which a space is formed to accommodate the fixed contact and the movable contact; a frame surrounding the arc chamber; a magnet holder unit disposed between the outside of the arc chamber and the inside of the frame and comprising a first holder and a second holder that are different from each other; and a magnet unit attached to one surface of the magnet holder unit facing the arc chamber and forming a magnetic field in the arc chamber, wherein the first holder and the second holder are each bent and extended at a predetermined angle, are spaced apart from each other and are arranged in a direction parallel to the arrangement direction of the fixed contact, and are arranged such that their respective concave portions face each other, wherein the magnet unit includes: a first magnet and a second magnet disposed adjacent to one surface of the first holder facing the arc chamber and extending from one end or the other end of the first holder along the one surface of the first holder; and a third magnet and a fourth magnet disposed adjacent to one surface of the second holder facing the arc chamber and extending from one end or the other end of the second holder along the one surface of the second holder, and wherein the first magnet, the second magnet, the third magnet and the fourth magnet are all magnetized with the same polarity.

In addition, in the magnet unit, the first magnet and the third magnet may be arranged to face each other, and the second magnet and the fourth magnet may be arranged to face each other.

In addition, the first magnet may extend in a direction parallel to an extension direction of the third magnet, and the second magnet may extend in a direction parallel to an extension direction of the fourth magnet, and its extension direction may intersect the extension direction of the first magnet.

In addition, the first magnet may be arranged to face the second magnet each other, with a virtual line extending along the arrangement direction of the fixed contact interposed therebetween, and the third magnet may be arranged to face the fourth magnet each other with the virtual line interposed therebetween.

In addition, the arc path formation unit may further include an auxiliary magnet that overlaps a central point of the plurality of fixed contacts in a movement direction of the movable contact and forms a magnetic field in the arc chamber.

In addition, the auxiliary magnet may have an extension direction parallel to the arrangement direction of the first holder and the second holder.

In addition, the auxiliary magnet may have an extension direction that intersects the arrangement direction of the first holder and the second holder.

Among the various effects of the present disclosure, the effects that can be obtained through the above-described solution are as follows.

First, the arc path formation unit includes a magnet unit. The magnet unit forms a magnetic field inside the arc path formation unit. The formed magnetic field forms an electromagnetic force together with an electric current energized in the fixed contact and the movable contact accommodated in the arc path formation unit.

In this case, the generated arc is formed in a direction away from each fixed contact. An arc generated when the fixed contact and the movable contact are separated may be guided by the electromagnetic force.

Therefore, the generated arc can be quickly extinguished and discharged to the outside of the arc path formation unit and the direct current relay.

In addition, the magnet unit may include a plurality of magnets. The plurality of magnets is formed to strengthen the intensity of electromagnetic force formed in the vicinity of each fixed contact. That is, the arc path formation units formed near the same fixed contact by different magnets are formed in the same direction.

Therefore, the intensity of the magnetic field formed near each fixed contact and the intensity of the electromagnetic force dependent on the intensity of the magnetic field can also be strengthened. As a result, the intensity of the electromagnetic force guiding the generated arc is enhanced, so that the generated arc can be effectively extinguished and discharged.

In addition, the direction of the electromagnetic force formed by the magnetic field formed by the magnet unit and the electric current energized in the fixed contact and the movable contact is formed in a direction away from the central portion.

Furthermore, since the intensity of the magnetic field and electromagnetic force is strengthened by the magnet unit as described above, the generated arc can be extinguished and moved quickly in a direction away from the central portion.

Therefore, damage to various components provided in the vicinity of the central portion for the operation of the direct current relay can be prevented.

In addition, in various embodiments, a plurality of fixed contacts can be provided. The magnet unit provided in the arc path formation unit forms magnetic fields in different directions in the vicinity of each fixed contact. Therefore, paths of arcs generated in the vicinity of each fixed contact proceed in different directions.

Therefore, the arcs generated in the vicinity of each fixed contact do not meet each other.

Accordingly, malfunctions or safety accidents or the like that may occur due to collisions of arcs generated at different locations can be prevented.

In addition, the magnet unit and the magnet holder unit are located inside the frame surrounding the arc chamber. That is, the magnet unit and the magnet holder unit are located between the inside of the frame and the outside of the arc chamber.

Therefore, no separate design change is required to place the magnet unit and the magnet holder unit outside the arc chamber.

Therefore, the arc path formation unit according to various embodiments of the present disclosure can be provided in the direct current relay without excessive design change.

Furthermore, time and cost for applying the arc path formation unit according to various embodiments of the present disclosure can be reduced.

DETAILED DESCRIPTION

Figure 1:
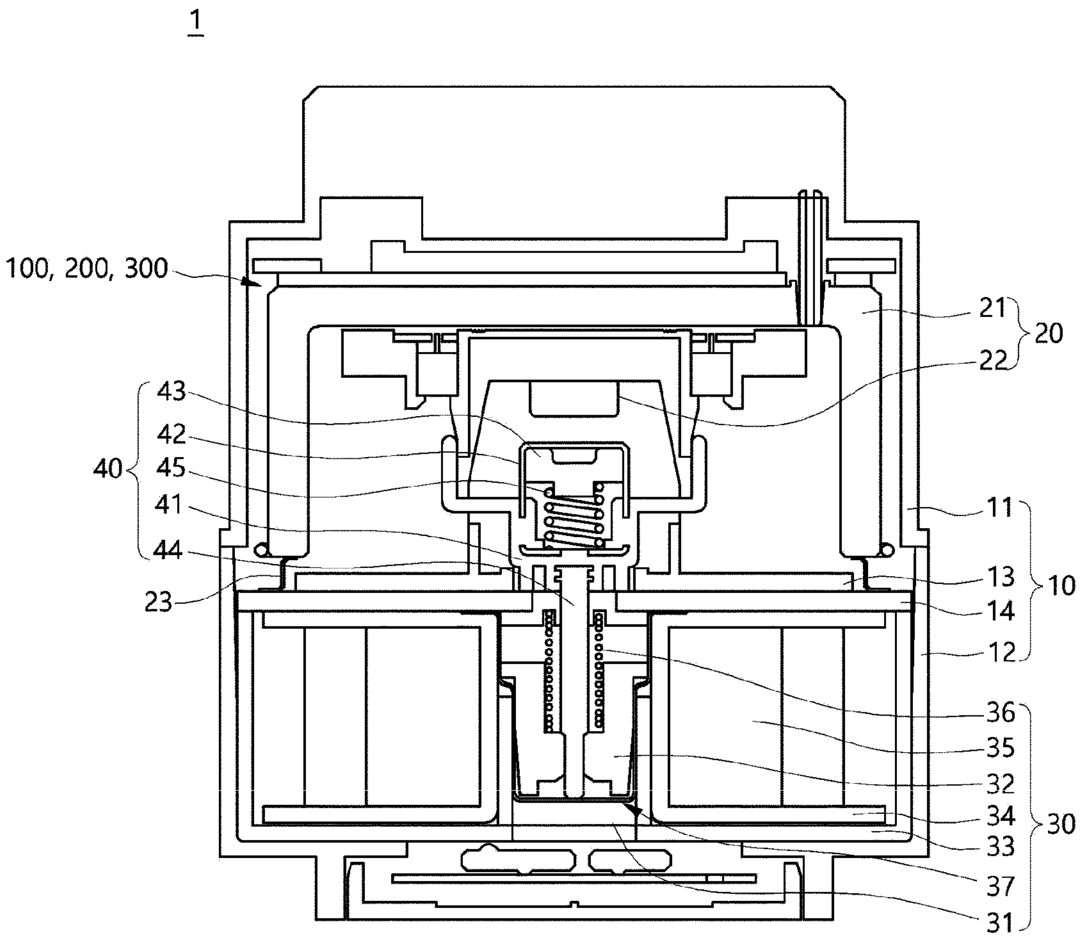
FIG. 1 is a front cross-sectional view illustrating a direct current relay according to an exemplary embodiment of the present disclosure.

Hereinafter, the arc path formation units 100, 200, and 300 and the direct current relay 1 including the same according to embodiments of the present disclosure will be described in more detail with reference to the drawings.

In the following description, in order to clarify the features of the present disclosure, descriptions of some components may be omitted.

In this specification, even in different embodiments, the same reference numerals will designate the same elements, and a redundant description thereof will be omitted.

The accompanying drawings are only for easy understanding of the embodiments disclosed herein, and the technical ideas disclosed herein are not limited by the accompanying drawings.

Expressions in the singular include plural expressions unless the context clearly indicates otherwise.

Figure 2:
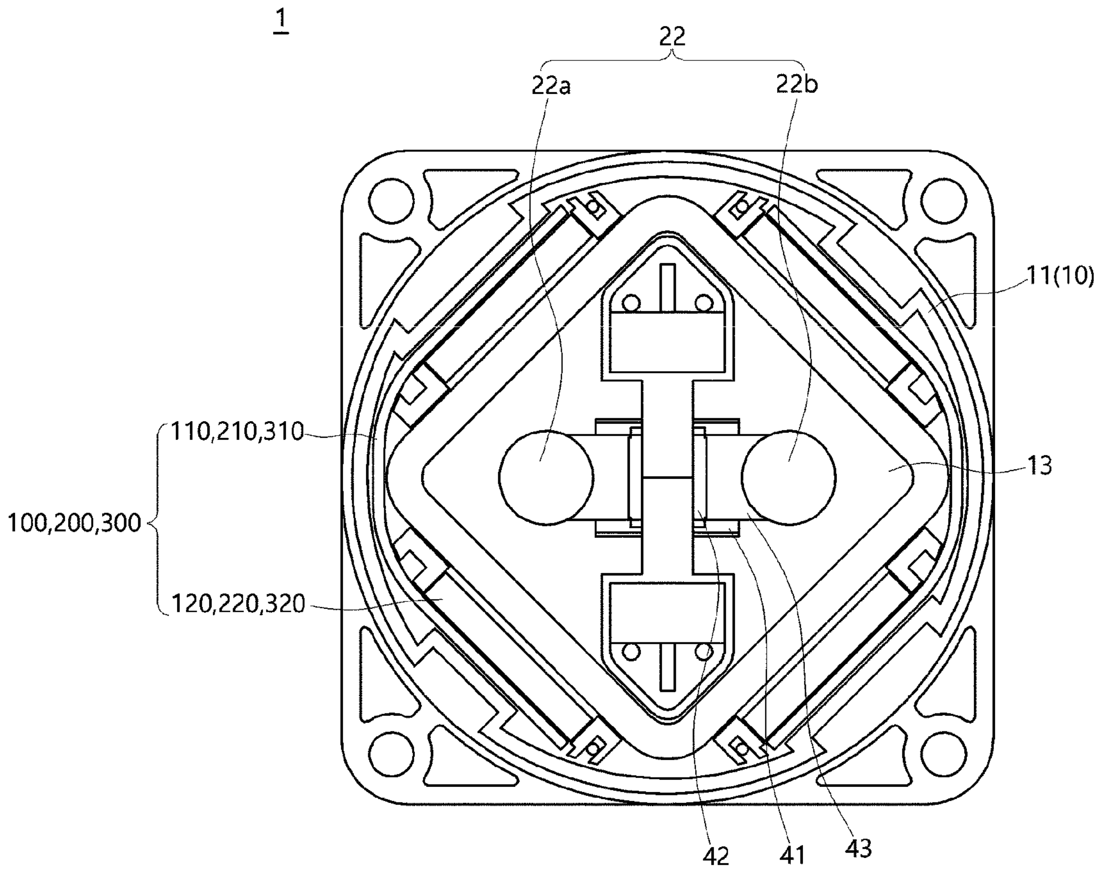
FIG. 2 is a plan cross-sectional view illustrating the direct current relay of FIG. 1.

1. Description of the Direct Current Relay 1 According to an Embodiment of the Present Disclosure Hereinafter, a direct current relay 1 according to an embodiment of the present disclosure will be described with reference to FIGS. 1 to 2.

The direct current relay 1 according to an embodiment of the present disclosure includes a frame unit 10, a switch unit 20, a core unit 30, and a movable contact unit 40. In addition, the direct current relay 1 includes an arc path formation unit 100, 200, 300.

The arc path formation unit 100, 200, 300 may form a discharge path of the generated arc.

Hereinafter, the configuration of the direct current relay 1 according to an embodiment of the present disclosure will be described with reference to the attached drawings, but the frame unit 10, switch unit 20, the core unit 30, the movable contact unit 40, and the arc path formation unit 100, 200, 300 will be described in separate sections.

The arc path formation unit 100, 200, 300 according to various embodiments described below will be described on the premise that they are provided in a direct current relay 1. However, it will be understood that the arc path formation unit 100, 200, 300 may be applied to a type of device, such as electromagnetic contactor and electromagnetic switch, capable of energizing electric current or blocking electric current with the outside by contact and separation between the fixed contact and the movable contact.

(1) Description of the Frame Unit 10

The frame unit 10 forms the outer side of the direct current relay 1. A predetermined space is formed inside the frame unit 10. Various devices performing a function of applying or blocking electric current transferred from the outside by the direct current relay 1 may be accommodated in the space. That is, the frame unit 10 functions as a kind of housing 41.

In an embodiment, the frame unit 10 is formed of an insulating material such as synthetic resin, so that arbitrary energization of the inside and outside of the frame unit 10 can be prevented.

In the illustrated embodiment, the frame unit 10 includes an upper frame 11, a lower frame 12, an insulating plate 13, and a support plate 14.

The upper frame 11 forms an upper side of the frame unit 10. A predetermined space is formed inside the upper frame 11.

The switch unit 20 and the movable contact unit 40 may be accommodated in the inner space of the upper frame 11. In addition, the arc path formation unit 100, 200, 300 may be accommodated in the inner space of the upper frame 11.

A fixed contact 22 of the switch unit 20 is positioned on one side of the upper frame 11, that is, on the upper side in the illustrated embodiment. A portion of the fixed contact 22 may be exposed on the upper side of the upper frame 11, and may be energizably connected to an external power source or load. To this end, a through hole through which the fixed contact 22 is through-coupled may be formed on one side of the upper frame 11.

The lower frame 12 forms a lower side of the frame unit 10. A predetermined space is formed inside the lower frame 12. The core unit 30 may be accommodated in the inner space of the lower frame 12.

The lower frame 12 may be coupled to the upper frame 11. The insulating plate 13 and the support plate 14 may be provided in a space between the lower frame 12 and the upper frame 11.

The insulating plate 13 is positioned between the upper frame 11 and the lower frame 12.

The insulating plate 13 electrically separates the upper frame 11 and the lower frame 12. To this end, the insulating plate 13 is preferably formed of an insulating material such as synthetic resin.

By the insulating plate 13, any energization between the switch unit 20, the movable contact unit 40, and the arc path formation unit 100, 200, 300 accommodated in the upper frame 11 and the core unit 30 accommodated in the lower frame 12 may be prevented.

A through hole (not shown) is formed in the central portion of the insulating plate 13. A shaft 44 of the movable contact unit 40 is through-coupled to the through hole so as to be movable in the up-down direction.

The support plate 14 is positioned below the insulating plate 13.

The support plate 14 supports the lower side of the insulating plate 13.

The support plate 14 is positioned between the upper frame 11 and the lower frame 12.

The support plate 14 physically separates the upper frame 11 and the lower frame 12.

The support plate 14 may be formed of a magnetic material. Therefore, the support plate 14 may form a magnetic circuit together with a yoke 33. A driving force for moving a movable core 32 of the core unit 30 toward a stationary core 31 may be formed by the magnetic circuit.

A through hole (not shown) is formed in the central portion of the support plate 14. The shaft 44 is through-coupled to the through hole so as to be movable in the up-down direction.

Therefore, when the movable core 32 is moved in a direction toward the stationary core 31 or away from the stationary core 31, the shaft 44 and a movable contact 43 connected to the shaft 44 may also be moved together in the same direction.

(2) Description of the Switch Unit 20

The switch unit 20 allows or blocks electric current energization according to the operation of the core unit 30. Specifically, the switch unit 20 may allow or block energizing electric current by contacting or separating the fixed contact 22 and the movable contact 43.

The switch unit 20 is accommodated in the inner space of the upper frame 11. The switch unit 20 may be electrically and physically separated from the core unit 30 by the insulating plate 13 and the support plate 14.

In the illustrated embodiment, the switch unit 20 includes an arc chamber 21, a fixed contact 22, and a sealing member 23.

The arc chamber 21 extinguishes an arc generated when the fixed contact 22 and the movable contact 43 are separated from each other in the inner space. Accordingly, the arc chamber 21 may be referred to as an "arc extinguishing unit."

The arc chamber 21 hermetically accommodates the fixed contact 22 and the movable contact 43. That is, the fixed contact 22 and the movable contact 43 are accommodated inside the arc chamber 21. Therefore, an arc generated when the fixed contact 22 and the movable contact 43 are separated from each other does not arbitrarily leak to the outside.

A gas for extinguishing may be filled in the arc chamber 21. The gas for extinguishing allows the generated arc to be extinguished and discharged to the outside of the direct current relay 1 through a preset path. To this end, a communication hole (not shown) may be formed through a wall surrounding the inner space of the arc chamber 21.

In an embodiment, the arc chamber 21 may be formed of an insulating material. In another embodiment, the arc chamber 21 may be formed of a material having high pressure resistance and high heat resistance. This is due to the generated arc being the flow of high temperature and high pressure electrons. For example, the arc chamber 21 may be formed of a ceramic material.

A plurality of through holes may be formed on the upper side of the arc chamber 21. A fixed contact 22 is through-coupled to each of the through holes.

In the illustrated embodiment, two fixed contacts 22 are provided, including a first fixed contact 22*a* and a second fixed contact 22*b*. Accordingly, two through holes may also be formed on the upper side of the arc chamber 21.

When the fixed contact 22 is through-coupled to the through hole, the through hole is sealed. That is, the fixed contact 22 is hermetically coupled to the through hole. Accordingly, the generated arc is not discharged to the outside through the through hole.

The lower side of the arc chamber 21 may be open. The insulating plate 13 and the sealing member 23 are in contact with the lower side of the arc chamber 21. That is, the lower side of the arc chamber 21 is sealed by the insulating plate 13 and the sealing member 23.

Accordingly, the arc chamber 21 may be electrically and physically separated from the outer space of the upper frame 11.

The arc extinguished in the arc chamber 21 is discharged to the outside of the direct current relay 1 through a preset path. In an embodiment, the extinguished arc may be discharged to the outside of the arc chamber 21 through the communication hole.

An arc path formation unit 100, 200, 300 may be provided on the outside of the arc chamber 21. The arc path formation unit 100, 200, 300 may form a magnetic field for forming an arc path A.P for an arc generated inside the arc chamber 21. This will be described later in detail.

The fixed contact 22 is in contact with or separated from the movable contact 43 to apply or block internal and external energization of the direct current relay 1.

Specifically, when the fixed contact 22 is in contact with the movable contact 43, the inside and outside of the direct current relay 1 may be energized. On the other hand, when the fixed contact 22 is separated from the movable contact 43, the energization of the inside and outside of the direct current relay 1 is blocked.

As can be seen from the name, the fixed contact 22 is not moved. That is, the fixed contact 22 is fixedly coupled to the upper frame 11 and the arc chamber 21. Thus, the contact and separation of the fixed contact 22 and the movable contact 43 are achieved by the movement of the movable contact 43.

One end of the fixed contact 22, that is, the upper end in the illustrated embodiment, is exposed to the outside of the upper frame 11. A power source or load is energizably connected to the one end, respectively.

A plurality of fixed contacts 22 may be provided. In the illustrated embodiment, two fixed contacts 22 are provided, including a first fixed contact 22*a* on the left side and a second fixed contact 22*b* on the right side.

The first fixed contact 22*a* is positioned to be biased to one side, that is, to the left in the illustrated embodiment, from the center in the longitudinal direction of the movable contact 43. In addition, the second fixed contact 22*b* is positioned to be biased to the other side, that is, to the right in the illustrated embodiment, from the center in the longitudinal direction of the movable contact 43.

A power source may be energizably connected to any one of the first fixed contact 22*a* and the second fixed contact 22*b*. In addition, a load may be energizably connected to the other one of the first fixed contact 22*a* and the second fixed contact 22*b*.

The direct current relay 1 according to an embodiment of the present disclosure may form an arc path A.P regardless of the direction of a power source or load connected to the fixed contact 22. This is achieved by the arc path formation unit 100, 200, 300, a detailed description of which will be provided later.

The other end of the fixed contact 22, that is, the lower end in the illustrated embodiment, extends toward the movable contact 43.

When the movable contact 43 is moved in a direction toward the fixed contact 22, that is, upward in the illustrated embodiment, the lower end comes into contact with the movable contact 43. Accordingly, the outside and the inside of the direct current relay 1 may be energized.

The lower end of the fixed contact 22 is located inside the arc chamber 21.

When the control power is cut off, the movable contact 43 is spaced apart from the fixed contact 22 by an elastic force of a return spring 36.

In this case, as the fixed contact 22 and the movable contact 43 are spaced apart from each other, an arc is generated between the fixed contact 22 and the movable contact 43. The generated arc may be extinguished by a gas for extinguishing inside the arc chamber 21 and may be discharged to the outside along a path formed by the arc path formation unit 100, 200, 300.

The sealing member 23 blocks any communication between the arc chamber 21 and a space inside the upper frame 11.

The sealing member 23 seals the lower side of the arc chamber 21 together with the insulating plate 13 and the support plate 14. Specifically, the upper side of the sealing member 23 is coupled to the lower side of the arc chamber 21. In addition, the radially inner side of the sealing member 23 is coupled to the outer circumference of the insulating plate 13, and the lower side of the sealing member 23 is coupled to the support plate 14.

Therefore, the arc generated in the arc chamber 21 and the arc extinguished by the gas for extinguishing do not arbitrarily leak into the inner space of the upper frame 11.

In addition, the sealing member 23 may be configured to block any communication between the inner space of the cylinder 37 and the inner space of the frame unit 10.

(3) Description of the Core Unit 30

The core unit 30 moves the movable contact unit 40 upward according to the application of the control power. In addition, when the application of the control power is released, the core unit 30 moves the movable contact unit 40 downward again.

The core unit 30 may be energizably connected to an external control power (not shown) to receive the control power.

The core unit 30 is located below the switch unit 20. In addition, the core unit 30 is accommodated inside the lower frame 12. The core unit 30 and the switch unit 20 may be electrically and physically separated from each other by the insulating plate 13 and the support plate 14.

The movable contact unit 40 is positioned between the core unit 30 and the switch unit 20. The movable contact unit 40 may be moved by the driving force applied by the core unit 30. Accordingly, the movable contact 43 and the fixed contact 22 may be brought into contact with each other so that the direct current relay 1 may be energized.

In the illustrated embodiment, the core unit 30 includes a stationary core 31, a movable core 32, a yoke 33, a bobbin 34, a coil 35, a return spring 36, and a cylinder 37.

The stationary core 31 is magnetized by a magnetic field generated in the coil 35 to generate an electromagnetic repulsive force. Due to the electromagnetic repulsive force, the movable core 32 is moved in a direction away from the stationary core 31.

The stationary core 31 is not moved. That is, the stationary core 31 is fixedly coupled to the support plate 14 and the cylinder 37.

The stationary core 31 may be provided in any form capable of generating electromagnetic force by being magnetized by a magnetic field. In an embodiment, the stationary core 31 may be provided as a permanent magnet or an electromagnet or the like.

The stationary core 31 partially accommodates the lower side of the cylinder 37. In addition, the inner circumference of the stationary core 31 is in contact with the outer circumference of the cylinder 37.

A through hole (not shown) is formed at the central portion of the stationary core 31. The shaft 44 is through-coupled to the through hole so as to be movable up and down.

When the control power is applied, the movable core 32 is moved in a direction away from the stationary core 31 by electromagnetic repulsive force generated by the stationary core 31.

As the movable core 32 is moved, the shaft 44 coupled to the movable core 32 is moved in a direction away from the stationary core 31, that is, upward in the illustrated embodiment. In addition, as the shaft 44 is moved, the movable contact unit 40 coupled to the shaft 44 is also moved upward.

Accordingly, the fixed contact 22 and the movable contact 43 may be brought into contact with each other so that the direct current relay 1 may be energized with an external power source or load.

The movable core 32 may be provided in any shape capable of being subjected to repulsive force by electromagnetic force. In an embodiment, the movable core 32 may be formed of a magnetic material or may be provided as a permanent magnet or an electromagnet or the like.

The movable core 32 is accommodated inside the cylinder 37. In addition, the movable core 32 may be moved in the longitudinal direction of the cylinder 37 inside the cylinder 37, that is, in the up-down direction in the illustrated embodiment.

Specifically, the movable core 32 may be moved in a direction toward the stationary core 31 and in a direction away from the stationary core 31.

The movable core 32 is coupled to the shaft 44. The movable core 32 may be moved integrally with the shaft 44. When the movable core 32 is moved upward or downward, the shaft 44 is also moved upward or downward. Accordingly, the movable contact 43 is also moved upward or downward.

The movable core 32 is located above the stationary core 31. The movable core 32 may be spaced apart from the stationary core 31 by a predetermined distance. The predetermined distance may be defined as a distance at which the movable core 32 can be moved in the up-down direction.

The movable core 32 is formed extending in the longitudinal direction. Inside the movable core 32, a hollow portion extending in the longitudinal direction is formed recessed by a predetermined distance. The return spring 36 and the lower side of the shaft 44 coupled through the return spring 36 are partially accommodated in the hollow portion.

A through hole is formed through the lower side of the hollow portion in the longitudinal direction. The hollow portion and the through hole communicate with each other. A lower end of the shaft 44 inserted into the hollow portion may progress toward the through hole.

At the lower end of the movable core 32, a space portion is formed recessed by a predetermined distance. The space portion communicates with the through hole. The lower head portion of the shaft 44 is located in the space portion.

The yoke 33 forms a magnetic circuit as control power is applied. The magnetic circuit formed by the yoke 33 may be configured to control the direction of the magnetic field formed by the coil 35.

Accordingly, when the control power is applied, the coil 35 may generate a magnetic field so that the movable core 32 is moved in a direction away from the stationary core 31.

In an embodiment, the yoke 33 may be formed of a conductive material capable of energizing.

The yoke 33 is accommodated inside the lower frame 12. The yoke 33 surrounds the coil 35. The coil 35 may be accommodated inside the yoke 33 to be spaced apart from the inner circumferential surface of the yoke 33 by a predetermined distance. The bobbin 34 is accommodated inside the yoke 33. That is, the yoke 33, the coil 35, and the bobbin 34 around which the coil 35 is wound are sequentially arranged in a radially inward direction from the outer circumference of the lower frame 12.

The upper side of the yoke 33 is in contact with the support plate 14. In addition, the outer circumference of the yoke 33 may be positioned to contact the inner circumference of the lower frame 12 or to be spaced apart from the inner circumference of the lower frame 12 by a predetermined distance.

The coil 35 is wound around the bobbin 34.

The bobbin 34 is accommodated inside the yoke 33.

The bobbin 34 may include a flat plate-shaped upper portion and a flat plate-shaped lower portion, and a cylindrical pillar portion extending in a longitudinal direction and connecting the upper portion and the lower portion. That is, the bobbin 34 has a bobbin shape.

An upper portion of the bobbin 34 is in contact with a lower side of the support plate 14. The coil 35 is wound around the pillar portion of the bobbin 34. The thickness of the coil 35 to be wound may be equal to or smaller than the diameters of the upper and lower portions of the bobbin 34.

A hollow portion extending in the longitudinal direction is formed through the pillar portion of the bobbin 34. The cylinder 37 may be accommodated in the hollow portion. The pillar portion of the bobbin 34 may be arranged to have the same central axis as the stationary core 31, the movable core 32, and the shaft 44.

The coil 35 generates a magnetic field by an applied control power. The stationary core 31 may be magnetized by a magnetic field generated by the coil 35, and an electromagnetic repulsive force may be applied to the movable core 32.

The coil 35 is wound around the bobbin 34. Specifically, the coil 35 is wound around the pillar portion of the bobbin 34 and stacked radially outward of the pillar portion. The coil 35 is accommodated inside the yoke 33.

When the control power is applied, the coil 35 generates a magnetic field. In this case, the intensity or direction or the like of the magnetic field generated by the coil 35 may be controlled by the yoke 33. The stationary core 31 may be magnetized by the magnetic field generated by the coil 35.

When the stationary core 31 is magnetized, the movable core 32 is subjected to an electromagnetic force, that is, a repulsive force, in a direction away from the stationary core 31. Accordingly, the movable core 32 is moved in a direction toward the stationary core 31, that is, upward in the illustrated embodiment.

The return spring 36 provides a restoring force for returning the movable core 32 to its original position when application of the control power is released after the movable core 32 is moved in a direction away from the stationary core 31.

As the movable core 32 is moved toward the stationary core 31 the return spring 36 is compressed and stores a restoring force. At this time, the stored restoring force is preferably smaller than the electromagnetic repulsive force applied to the movable core 32 after the stationary core 31 is magnetized. This is to prevent the movable core 32 from being arbitrarily returned to its original position by the return spring 36 while the control power is applied.

When the application of the control power is released, the movable core 32 receives a restoring force by the return spring 36. Of course, gravity due to the empty weight of the movable core 32 may also act on the movable core 32. Accordingly, the movable core 32 may be moved in a direction away from the stationary core 31 and returned to its original position.

The return spring 36 may be provided in any shape capable of deforming, storing restoring force, returning to its original shape, and transmitting the restoring force to the outside. In an embodiment, the return spring 36 may be provided as a coil spring 35.

The shaft 44 is coupled through the return spring 36. The shaft 44 may be moved in the up-down direction regardless of the shape deformation of the return spring 36 in a state in which the return spring 36 is coupled.

The return spring 36 is accommodated in a hollow portion formed recessed on the upper side of the movable core 32.

The cylinder 37 accommodates the movable core 32, the return spring 36, and the shaft 44. The movable core 32 and the shaft 44 may be moved inside the cylinder 37 in upward and downward directions.

The cylinder 37 is located in the hollow portion formed in the pillar portion of the bobbin 34. The side surface of the cylinder 37 is in contact with the inner circumferential surface of the pillar portion of the bobbin 34.

The upper end of the cylinder 37 is in contact with the lower surface of the support plate 14. The lower surface of the cylinder 37 may be in contact with the stationary core 31.

(4) Description of the Movable Contact Unit 40

The movable contact unit 40 includes a movable contact 43 and a component for moving the movable contact 43. The direct current relay 1 may be energized with an external power source or load by the movable contact unit 40.

The movable contact unit 40 is accommodated in the inner space of the upper frame 11. In addition, the movable contact unit 40 is accommodated in the arc chamber 21 to be movable up and down.

A fixed contact 22 is positioned above the movable contact unit 40. The movable contact unit 40 is accommodated in the arc chamber 21 to be movable in a direction toward the fixed contact 22 and in a direction away from the fixed contact 22.

A core unit 30 is positioned below the movable contact unit 40. The movement of the movable contact unit 40 may be achieved by the movement of the movable core 32.

In the illustrated embodiment, the movable contact unit 40 includes a housing 41, a cover 42, a movable contact 43, a shaft 44, and an elastic portion 45.

The housing 41 accommodates the movable contact 43 and the elastic portion 45 elastically supporting the movable contact 43.

In the illustrated embodiment, the housing 41 is open on one side and the other side opposite thereto. The movable contact 43 may be inserted through the open portion. The non-open side of the housing 41 may be configured to surround the accommodated movable contact 43.

The cover 42 is provided above the housing 41.

The cover 42 covers the upper surface of the movable contact 43 accommodated in the housing 41.

The housing 41 and the cover 42 are preferably formed of an insulating material to prevent unintentional energization. In an embodiment, the housing 41 and the cover 42 may be formed of a synthetic resin or the like.

The lower side of the housing 41 is connected to the shaft 44. When the movable core 32 connected to the shaft 44 is moved upward or downward, the housing 41 and the movable contact 43 accommodated therein may also be moved upward or downward.

The housing 41 and the cover 42 may be coupled by any member. In an embodiment, the housing 41 and the cover 42 may be coupled by a fastening member (not shown) such as a bolt or nut.

The movable contact 43 comes into contact with the fixed contact 22 according to the application of control power, so that the direct current relay 1 is energized with an external power source and load. In addition, the movable contact 43 is separated from the fixed contact 22 when the application of the control power is released, so that the direct current relay 1 is made not energizable with an external power source and load.

The movable contact 43 is positioned adjacent to the fixed contact 22.

The upper side of the movable contact 43 is partially covered by the cover 42. In an embodiment, a portion of the upper surface of the movable contact 43 may be in contact with the lower surface of the cover 42.

The lower side of the movable contact 43 is elastically supported by the elastic portion 45. To prevent the movable contact 43 from moving arbitrarily downward, the elastic portion 45 may elastically support the movable contact 43 in a compressed state by a predetermined distance.

The movable contact 43 is formed extending in the longitudinal direction, that is, in the left-right direction in the illustrated embodiment. That is, the length of the movable contact 43 is formed longer than the width. Therefore, both ends in the longitudinal direction of the movable contact 43 accommodated in the housing 41 are exposed to the outside of the housing 41.

Contact protrusion portions protruding upward by a predetermined distance may be formed from the both ends. The fixed contact 22 is in contact with the contact protrusion portion.

The contact protrusion portion may be formed at a position corresponding to each fixed contact 22. Accordingly, the moving distance of the movable contact 43 may be reduced, and contact reliability between the fixed contact 22 and the movable contact 43 may be improved.

The width of the movable contact 43 may be the same as the distance at which each side surface of the housing 41 is spaced apart from each other. That is, when the movable contact 43 is accommodated in the housing 41, both side surfaces of the movable contact 43 in the width direction may contact inner surfaces of each side surface of the housing 41. Accordingly, the state in which the movable contact 43 is accommodated in the housing 41 can be stably maintained.

The shaft 44 transmits a driving force generated as the core unit 30 is operated to the movable contact unit 40. Specifically, the shaft 44 is connected to the movable core 32 and the movable contact 43. When the movable core 32 is moved upward or downward, the movable contact 43 may be also moved upward or downward by the shaft 44.

The shaft 44 is formed extending in the longitudinal direction, that is, in the up-down direction in the illustrated embodiment.

The lower end of the shaft 44 is inserted into and coupled to the movable core 32. When the movable core 32 is moved in the up-down direction, the shaft 44 may be moved together with the movable core 32 in the up-down direction.

The return spring 36 is coupled through the body portion of the shaft 44.

The upper end of the shaft 44 is coupled to the housing 41. When the movable core 32 is moved, the shaft 44 and the housing 41 may be moved together.

Upper and lower ends of the shaft 44 may be formed to have larger diameters than the body portion of the shaft 44. Accordingly, the shaft 44 may be stably coupled to the housing 41 and the movable core 32.

The elastic portion 45 elastically supports the movable contact 43. When the movable contact 43 comes into contact with the fixed contact 22, the movable contact 43 tends to be spaced apart from the fixed contact 22 by electromagnetic repulsive force. In this case, the elastic portion 45 elastically supports the movable contact 43 to prevent the movable contact 43 from being arbitrarily separated from the fixed contact 22.

The elastic portion 45 may be provided in any form capable of storing a restoring force by deformation of a shape and providing the stored restoring force to other members. In an embodiment, the elastic portion 45 may be provided as a coil spring 35.

One end of the elastic portion 45 facing the movable contact 43 is in contact with the lower side of the movable contact 43. In addition, the other end facing the one end is in contact with the upper side of the housing 41.

The elastic portion 45 may elastically support the movable contact 43 in a state in which a restoring force is stored after being compressed by a predetermined distance. Accordingly, even if an electromagnetic repulsive force is generated between the movable contact 43 and the fixed contact 22, the movable contact 43 is not moved arbitrarily.

For stable coupling of the elastic portion 45, a protrusion portion (not shown) inserted into the elastic portion 45 may protrude from the lower side of the movable contact 43. Likewise, a protrusion portion (not shown) inserted into the elastic portion 45 may protrude from the upper side of the housing 41.

2. Description of the Arc Path Formation Unit 100 According to an Embodiment of the Present Disclosure Hereinafter, the arc path formation unit 100 according to an embodiment of the present disclosure will be described with reference to FIGS. 3 to 8.

The arc path formation unit 100 forms a magnetic field inside the arc chamber 21. An electromagnetic force is formed inside the arc chamber 21 by the electric current energizing through the direct current relay 1 and the formed magnetic field.

An arc generated as the fixed contact 22 and the movable contact 43 are separated is moved out of the arc chamber 21 by the formed electromagnetic force. Specifically, the generated arc is moved along the direction of the formed electromagnetic force. Accordingly, it can be said that the arc path formation unit 100 forms an arc path A.P, which is a path through which the generated arc flows.

The arc path formation unit 100 is located in a space formed inside the upper frame 11. The arc path formation unit 100 is arranged to surround the arc chamber 21. In other words, the arc chamber 21 is located inside the arc path formation unit 100.

The fixed contact 22 and the movable contact 43 are positioned inside the arc path formation unit 100. An arc generated when the fixed contact 22 and the movable contact 43 are separated may be guided by the electromagnetic force formed by the arc path formation unit 100.

The arc path formation unit 100 according to the present embodiment includes a magnet holder unit 110 and a magnet unit 120.

The magnet holder unit 110 forms the skeleton of the arc path formation unit 100 and fixes the magnet unit 120, which will be described later, to the outside of the arc chamber 21.

The magnet holder unit 110 is disposed outside the arc chamber 21 and inside the upper frame 11.

The fixed contact 22 and the movable contact 43 are located radially inside the magnet holder unit 110. The central portion of the fixed contact 22 and the movable contact 43 may be defined as a central portion C. In the illustrated embodiment, the magnet holder unit 110 is arranged so that its center corresponds to the central portion C of the fixed contact 22 and the movable contact 43.

The central portion C is located between the first fixed contact 22*a* and the second fixed contact 22*b*. In addition, the central portion of the movable contact unit 40 is positioned vertically below the central portion C. That is, central portions of the housing 41, the cover 42, the movable contact 43, the shaft 44, the elastic portion 45 or the like are positioned vertically below the central portion C.

Therefore, when the generated arc is moved toward the central portion C, damage to the above components may occur. To prevent this, the arc path formation unit 100 according to the present embodiment includes a magnet unit 120. A detailed description of this will be provided later along with a description of the magnet unit 120.

In an embodiment, the magnet holder unit 110 may be formed of an electrically conductive material. In the above embodiment, the magnet holder unit 110 may be magnetized to the same polarity as a plurality of adjacent magnets.

The magnet holder unit 110 may include a plurality of holders. Each holder may be coupled with a plurality of magnets. In an embodiment, a plurality of magnets attached to one holder are all magnetized to the same polarity.

In the illustrated embodiment, the magnet holder unit 110 includes a total of two holders, including a first holder 111 and a second holder 112.

The first holder 111 and the second holder 112 are arranged to be spaced apart from each other. That is, an empty space is formed between the first holder 111 and the second holder 112. The space may function as a passage through which the arc generated in the arc chamber 21 is discharged.

In addition, the first holder 111 and the second holder 112 are arranged in a direction parallel to the arrangement direction of a plurality of fixed contacts 22.

The first holder 111 and the second holder 112 are each bent and extended at a predetermined angle. In addition, the edges of the bent portions of the first holder 111 and the second holder 112 may be chamfered. In an embodiment, the predetermined angle may be a right angle.

The first holder 111 and the second holder 112 may be in contact with or fixedly coupled to the inner circumferential surface of the upper frame 11. Accordingly, the first holder 111 and the second holder 112 are preferably formed in a shape corresponding to the inner circumferential surface of the upper frame 11.

The first holder 111 and the second holder 112 are arranged so that the concave portions of each of the bent portions face each other, with the central portion C of the fixed contact 22 and the movable contact 43 interposed therebetween.

In addition, the first holder 111 and the second holder 112 are formed in shapes that correspond to each other. In the illustrated embodiment, the first holder 111 and the second holder 112 are formed in a structure that is symmetrical to each other with respect to the central portion C of the plurality of fixed contacts 22 and the movable contact 43.

The first holder 111 includes a first outer surface 111*a* and a first inner surface 111*b*.

The first outer surface 111*a* is located on one surface of the first holder 111 opposite to the fixed contact 22 and the movable contact 43. In addition, the first outer surface 111*a* is disposed adjacent to the inner circumferential surface of the upper frame 11. In an embodiment, the first outer surface 111*a* is formed in a shape corresponding to the inner circumferential surface of the upper frame 11.

The first inner surface 111*b* is positioned on the other surface opposite to the first outer surface 111*a* of the first holder 111. In addition, the first inner surface 111*b* is arranged to face the outer circumferential surface of the arc chamber 21 with the first magnet 121 and the second magnet 122 interposed therebetween. In an embodiment, the first inner surface 111*b* is formed in a shape corresponding to the outer circumferential surface of the arc chamber 21.

The first inner surface 1*l*1*b* is coupled to the first magnet 121 and the second magnet 122 of the magnet unit 120, which will be described later.

The second holder 112 includes a second outer surface 112*a* and a second inner surface 112*b*.

The second outer surface 112*a* is located on one surface of the second holder 112 opposite to the fixed contact 22 and the movable contact 43. In addition, the second outer surface 112*a* is disposed adjacent to the inner circumferential surface of the upper frame 11. In an embodiment, the second outer surface 112*a* is formed in a shape corresponding to the inner circumferential surface of the upper frame 11.

The second inner surface 112*b* is positioned on the other surface opposite to the second outer surface 112*a* of the second holder 112. In addition, the second inner surface 112*b* is arranged to face the outer circumferential surface of the arc chamber 21 with the third magnet 123 and the fourth magnet 124 interposed therebetween. In an embodiment, the second inner surface 112*b* is formed in a shape corresponding to the outer circumferential surface of the arc chamber 21.

The second inner surface 112*b* is coupled to the third magnet 123 and the fourth magnet 124 of the magnet unit 120, which will be described later.

The magnet unit 120 forms a magnetic field inside the arc chamber 21 in which the fixed contact 22 and the movable contact 43 are accommodated. In addition, the fixed contact 22 and the movable contact 43 are located radially inside the magnet unit 120. In the illustrated embodiment, the magnet unit 120 is arranged so that its center corresponds to the central portion C of the fixed contact 22 and the movable contact 43.

The magnet unit 120 may form a magnetic field by itself or with each other. The magnetic field formed by the magnet unit 120 forms electromagnetic force together with the electric current energizing through the fixed contact 22 and the movable contact 43. The formed electromagnetic force guides an arc generated when the fixed contact 22 and the movable contact 43 are spaced apart.

In this case, the arc path formation unit 100 forms electromagnetic force in a direction away from the central portion C of the fixed contact 22 and the movable contact 43. Accordingly, the arc path A.P is also formed in a direction away from the central portion C of the fixed contact 22 and the movable contact 43.

As a result, each component provided in the direct current relay 1 may not be damaged by the generated arc. Furthermore, the generated arc can be quickly discharged to the outside of the arc chamber 21.

The magnet unit 120 is coupled to the inner surfaces 111*b* and 112*b* of the magnet holder unit 110. In an embodiment, a fastening member (not shown) may be provided to couple the magnet unit 120 and the inner surfaces 111*b* and 112*b* of the magnet holder unit 110.

The magnet unit 120 may include a plurality of magnets. In the present embodiment, the magnet unit 120 includes a total of four magnets, including a first magnet 121, a second magnet 122, a third magnet 123, and a fourth magnet 124.

The first magnet 121, the second magnet 122, the third magnet 123, and the fourth magnet 124 may each be provided in any shape capable of being magnetized to form a magnetic field inside the arc chamber 21. In addition, the first magnet 121, the second magnet 122, the third magnet 123, and the fourth magnet 124 are all formed to have polarity in the width direction.

The first magnet 121, the second magnet 122, the third magnet 123, and the fourth magnet 124 are arranged to be spaced apart from each other. That is, an empty space is formed between the first magnet 121, the second magnet 122, the third magnet 123, and the fourth magnet 124. In addition, the space between the first magnet 121 and the fourth magnet 124 or the space between the second magnet 122 and the third magnet 123 may function as a passage through which the arc generated in the arc chamber 21 is discharged.

The first magnet 121, the second magnet 122, the third magnet 123, and the fourth magnet 124 may be in contact with or fixedly coupled to the outer circumferential surface of the arc chamber 21. Accordingly, the first magnet 121, the second magnet 122, the third magnet 123, and the fourth magnet 124 are preferably formed in a shape corresponding to the outer circumferential surface of the arc chamber 21.

In an embodiment, the first magnet 121, the second magnet 122, the third magnet 123, and the fourth magnet 124 may be formed in shapes that correspond to each other. Specifically, the first magnet 121, the second magnet 122, the third magnet 123, and the fourth magnet 124 may be formed in shapes whose lengths in the width direction and breadth direction respectively correspond to each other.

The first magnet 121 is coupled to the first inner surface 111*b* of the first holder 111. In addition, the first magnet 121 extends from one end of the first holder 111 along the first inner surface 111*b*. In an embodiment, the first magnet 121 is formed in a shape corresponding to the first inner surface 111*b* of the first holder 111.

The first magnet 121 includes a first facing surface 121*a* and a first opposite surface 121*b*.

The first facing surface 121*a* is located on one surface of the first magnet 121 facing the central portion C of the fixed contact 22 and the movable contact 43. In addition, the first facing surface 121*a* is disposed adjacent to the outer circumferential surface of the arc chamber 21. In an embodiment, the first facing surface 121*a* is formed in a shape corresponding to the outer circumferential surface of the arc chamber 21.

The first opposite surface 121*b* is positioned on the other surface opposite to the first facing surface 121*a* of the first magnet 121. In addition, the first opposite surface 121*b* is disposed to face the inner circumferential surface of the upper frame 11 with the first holder 111 interposed therebetween. In an embodiment, the first opposite surface 121*b* is formed in a shape corresponding to the inner circumferential surface of the upper frame 11.

The second magnet 122 is coupled to the first inner surface 111*b* of the first holder 111.

In addition, the second magnet 122 extends along the first inner surface 111*b* from the other end of the first holder 111 opposite to the first magnet 121. In an embodiment, the second magnet 122 is formed in a shape corresponding to the first inner surface 111*b* of the first holder 111.

The extension direction of the second magnet 122 intersects the extension direction of the first magnet 121. This results from the fact that the first holder 111 coupled with the first magnet 121 and the second magnet 122 is bent and extended at a predetermined angle.

The second magnet 122 is arranged to face the first magnet 121 each other, with a virtual line extending along the arrangement direction of the plurality of fixed contacts 22 interposed therebetween.

The second magnet 122 includes a second facing surface 122*a* and a second opposite surface 122*b*.

The second facing surface 122*a* is located on one surface of the second magnet 122 facing the central portion C of the fixed contact 22 and the movable contact 43. In addition, the second facing surface 122*a* is disposed adjacent to the outer circumferential surface of the arc chamber 21. In an embodiment, the second facing surface 122*a* is formed in a shape corresponding to the outer circumferential surface of the arc chamber 21.

The second opposite surface 122*b* is positioned on the other surface opposite to the second facing surface 122*a* of the second magnet 122. In addition, the second opposite surface 122*b* is disposed to face the inner circumferential surface of the upper frame 11 with the first holder 111 interposed therebetween. In an embodiment, the second opposite surface 122*b* is formed in a shape corresponding to the inner circumferential surface of the upper frame 11.

The third magnet 123 is coupled to the second inner surface 112*b* of the second holder 112. In addition, the third magnet 123 extends from one end of the second holder 112 along the second inner surface 112*b*. In an embodiment, the third magnet 123 is formed in a shape corresponding to the second inner surface 112*b* of the second holder 112. In the illustrated embodiment, the third magnet 123 extends in a direction parallel to the extension direction of the first magnet 121.

The third magnet 123 is arranged to face the first magnet 121 each other, with the central portion C of the fixed contact 22 and the movable contact 43 interposed therebetween. That is, the first magnet 121, the central portion C, and the third magnet 123 are arranged side by side along a predetermined direction.

The third magnet 123 includes a third facing surface 123*a* and a third opposite surface 123*b*.

The third facing surface 123*a* is located on one surface of the third magnet 123 facing the central portion C of the fixed contact 22 and the movable contact 43. In addition, the third facing surface 123*a* is disposed adjacent to the outer circumferential surface of the arc chamber 21. In an embodiment, the third facing surface 123*a* is formed in a shape corresponding to the outer circumferential surface of the arc chamber 21.

The third opposite surface 123*b* is positioned on the other surface opposite to the third facing surface 123*a* of the third magnet 123. In addition, the third opposite surface 123*b* is disposed to face the inner circumferential surface of the upper frame 11 with the second holder 112 interposed therebetween. In an embodiment, the third opposite surface 123*b* is formed in a shape corresponding to the inner circumferential surface of the upper frame 11.

The fourth magnet 124 is coupled to the second inner surface 112*b* of the second holder 112. In addition, the fourth magnet 124 extends along the second inner surface 112*b* from the other end of the second holder 112 opposite to the third magnet 123. In an embodiment, the fourth magnet 124 is formed in a shape corresponding to the second inner surface 112*b* of the second holder 112. In the illustrated embodiment, the fourth magnet 124 extends in a direction parallel to the extension direction of the second magnet 122.

The extension direction of the fourth magnet 124 intersects the extension direction of the third magnet 123. This results from the fact that the second holder 112 coupled with the third magnet 123 and the fourth magnet 124 is bent and extended at a predetermined angle.

The fourth magnet 124 is arranged to face the third magnet 123 each other, with a virtual line extending along the arrangement direction of the plurality of fixed contacts 22 interposed therebetween.

The fourth magnet 124 is arranged to face the second magnet 122 each other, with the central portion C of the fixed contact 22 and the movable contact 43 interposed therebetween. That is, the second magnet 122, the central portion C, and the fourth magnet 124 are arranged side by side along a predetermined direction. The predetermined direction intersects the arrangement direction of the first magnet 121, the central portion C, and the third magnet 123.

In an embodiment, the shortest distance between the third magnet 123 and the fourth magnet 124 is formed to be the same as the shortest distance between the first magnet 121 and the second magnet 122.

The fourth magnet 124 includes a fourth facing surface 124*a* and a fourth opposite surface 124*b*.

The fourth facing surface 124*a* is located on one surface of the fourth magnet 124 facing the central portion C of the fixed contact 22 and the movable contact 43. In addition, the fourth facing surface 124*a* is disposed adjacent to the outer circumferential surface of the arc chamber 21. In an embodiment, the fourth facing surface 124*a* is formed in a shape corresponding to the outer circumferential surface of the arc chamber 21.

The fourth opposite surface 124*b* is positioned on the other surface opposite to the fourth facing surface 124*a* of the fourth magnet 124. In addition, the fourth opposite surface 124*b* is disposed to face the inner circumferential surface of the upper frame 11 with the second holder 112 interposed therebetween. In an embodiment, the fourth opposite surface 124*b* is formed in a shape corresponding to the inner circumferential surface of the upper frame 11.

Each of the facing surfaces 121*a*, 122*a*, 123*a*, and 124*a* of the first magnet 121, the second magnet 122, the third magnet 123, and the fourth magnet 124 is all magnetized with the same polarity. Each of the opposite surfaces 121*b*, 122*b*, 123*b*, and 124*b* of the first magnet 121, the second magnet 122, the third magnet 123, and the fourth magnet 124 is magnetized to polarities opposite to those of each of the facing surfaces 121*a*, 122*a*, 123*a*, and 124*a*, and thus, likewise, all are magnetized to the same polarity.

In an embodiment, the shortest distance from each of the facing surfaces 121*a*, 122*a*, 123*a*, and 124*a* of the first magnet 121, the second magnet 122, the third magnet 123, and the fourth magnet 124 to the central portion C of the fixed contact 22 and the movable contact 43 may all be formed the same.

Figure 3:
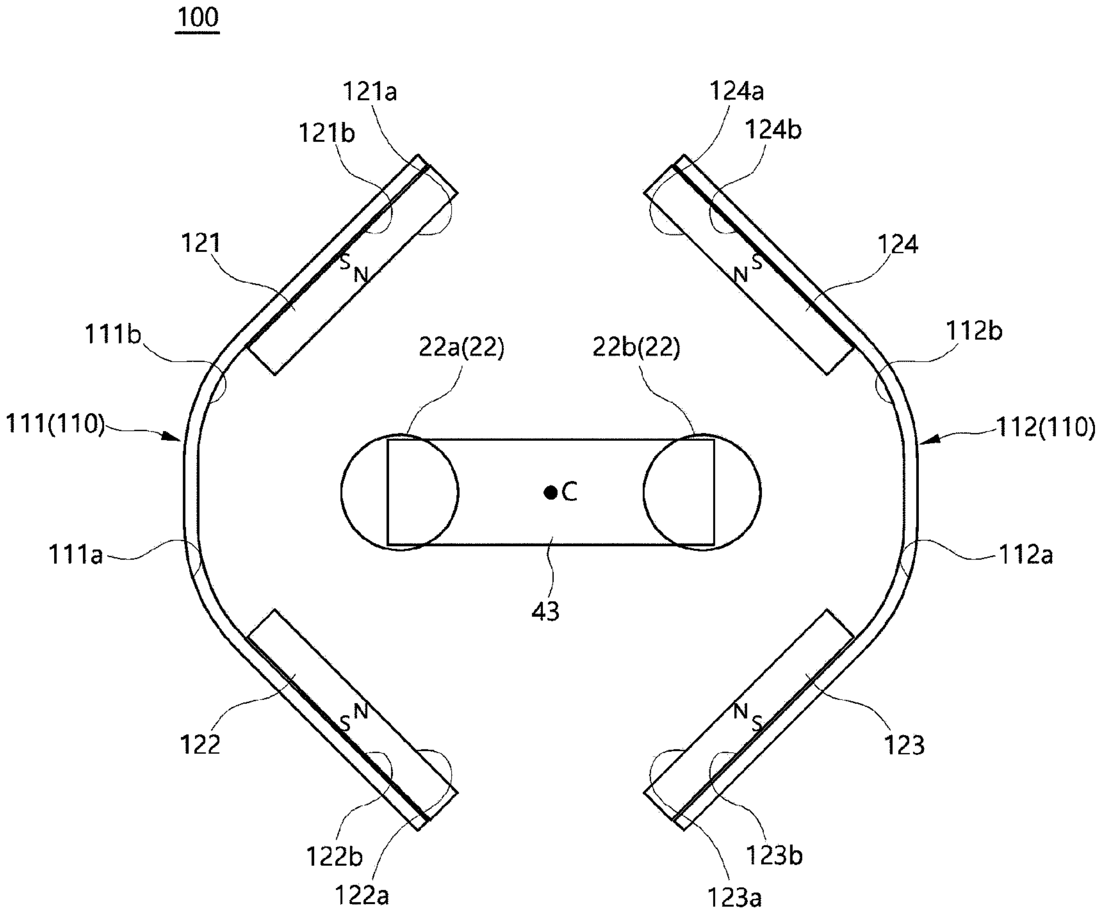
FIG. 3 is a conceptual diagram illustrating an arc path formation unit according to an embodiment of the present disclosure.
Figure 4:
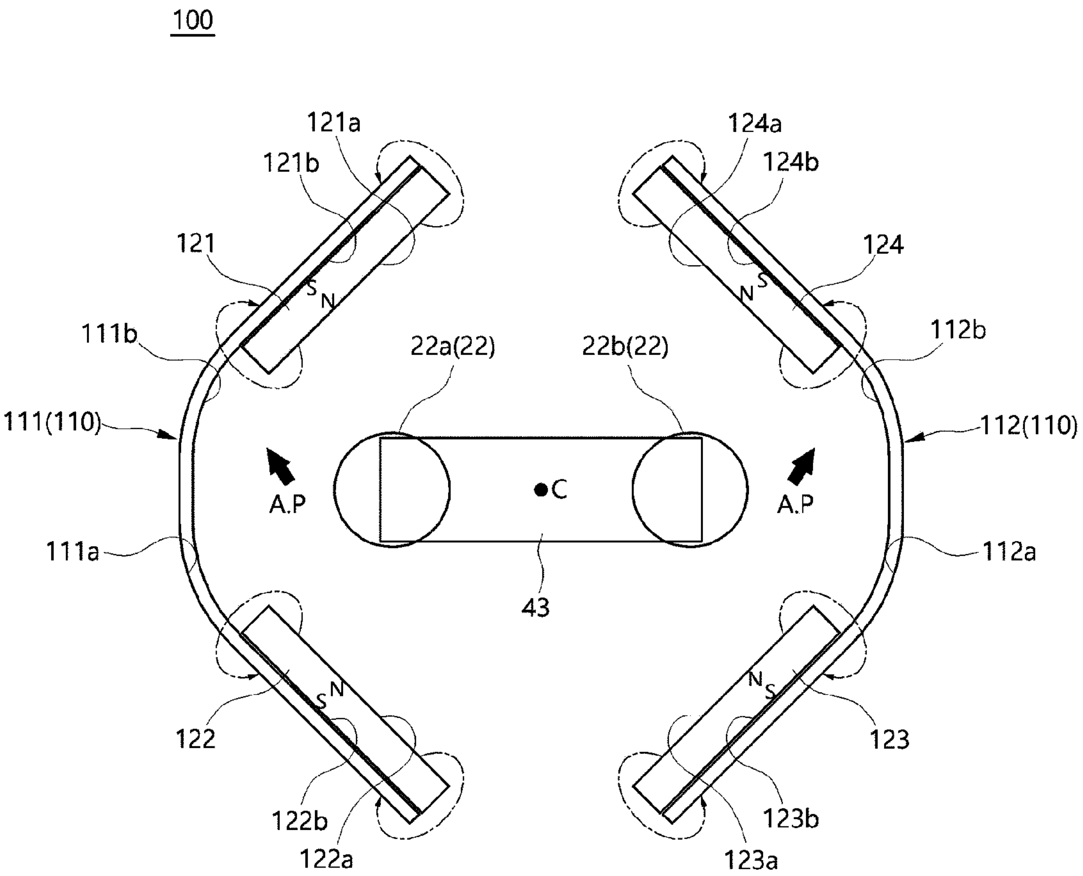
FIGS. 4 to 5 are conceptual diagrams illustrating the magnetic field and arc path formed by the arc path formation unit of FIG. 3.
Figure 5:
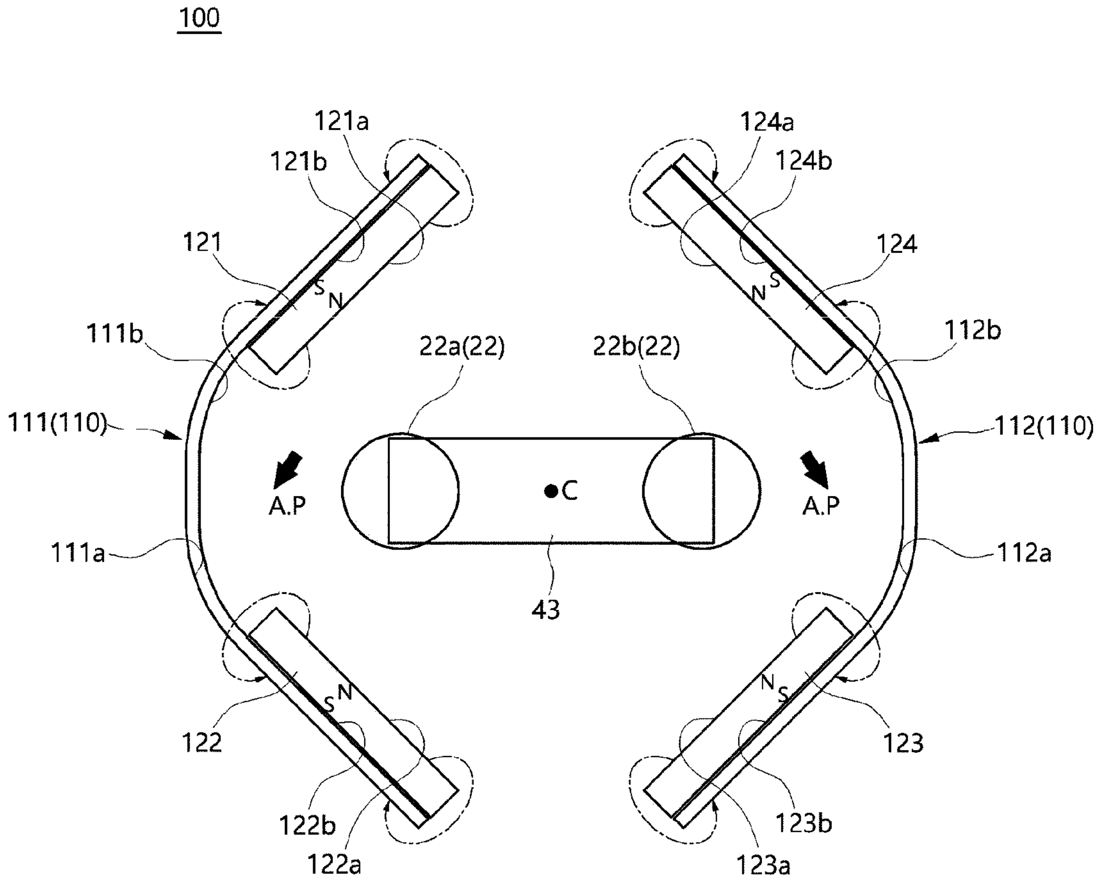

Referring to FIGS. 3 to 5, each of the facing surfaces 121*a*, 122*a*, 123*a*, and 124*a* of the first magnet 121, the second magnet 122, the third magnet 123, and the fourth magnet 124 is all magnetized to the N pole, and each of the opposite surfaces 121*b*, 122*b*, 123*b*, and 124*b* is all magnetized to the S pole. Accordingly, a magnetic field in a direction of pushing each other is formed between the first magnet 121, the second magnet 122, the third magnet 123, and the fourth magnet 124.

In addition, the first holder 111 and the second holder 112 are also magnetized together by the magnet unit 120 to form an additional magnetic field.

In the embodiment illustrated in FIG. 4, the direction of the electric current is a direction from the second fixed contact 22*b* through the movable contact 43 to the first fixed contact 22*a*.

If Fleming's left-hand rule is applied considering the direction of the electric current and the direction of the magnetic field in the first fixed contact 22*a*, the electromagnetic force generated in the vicinity of the first fixed contact 22*a* is formed to face upward and to the left. Accordingly, the arc path A.P in the vicinity of the first fixed contact 22*a* is also formed to face upward and to the left.

Likewise, if Fleming's left-hand rule is applied considering the direction of the electric current and the direction of the magnetic field in the second fixed contact 22*b*, the electromagnetic force generated in the vicinity of the second fixed contact 22*b* is formed to face upward and to the right. Accordingly, the arc path A.P in the vicinity of the second fixed contact 22*b* is also formed to face upward and to the right.

In the embodiment illustrated in FIG. 5, the direction of the electric current is a direction from the first fixed contact 22*a* through the movable contact 43 to the second fixed contact 22*b*.

If Fleming's left-hand rule is applied considering the direction of the electric current and the direction of the magnetic field in the first fixed contact 22*a*, the electromagnetic force generated in the vicinity of the first fixed contact 22*a* is formed to face downward and to the left. Accordingly, the arc path A.P in the vicinity of the first fixed contact 22*a* is formed to face downward and to the left.

Likewise, if Fleming's left-hand rule is applied considering the direction of the electric current and the direction of the magnetic field in the second fixed contact 22*b*, the electromagnetic force generated in the vicinity of the second fixed contact 22*b* is formed to face downward and to the right. Accordingly, the arc path A.P in the vicinity of the second fixed contact 22*b* is also formed to face downward and to the right.

Figure 6:
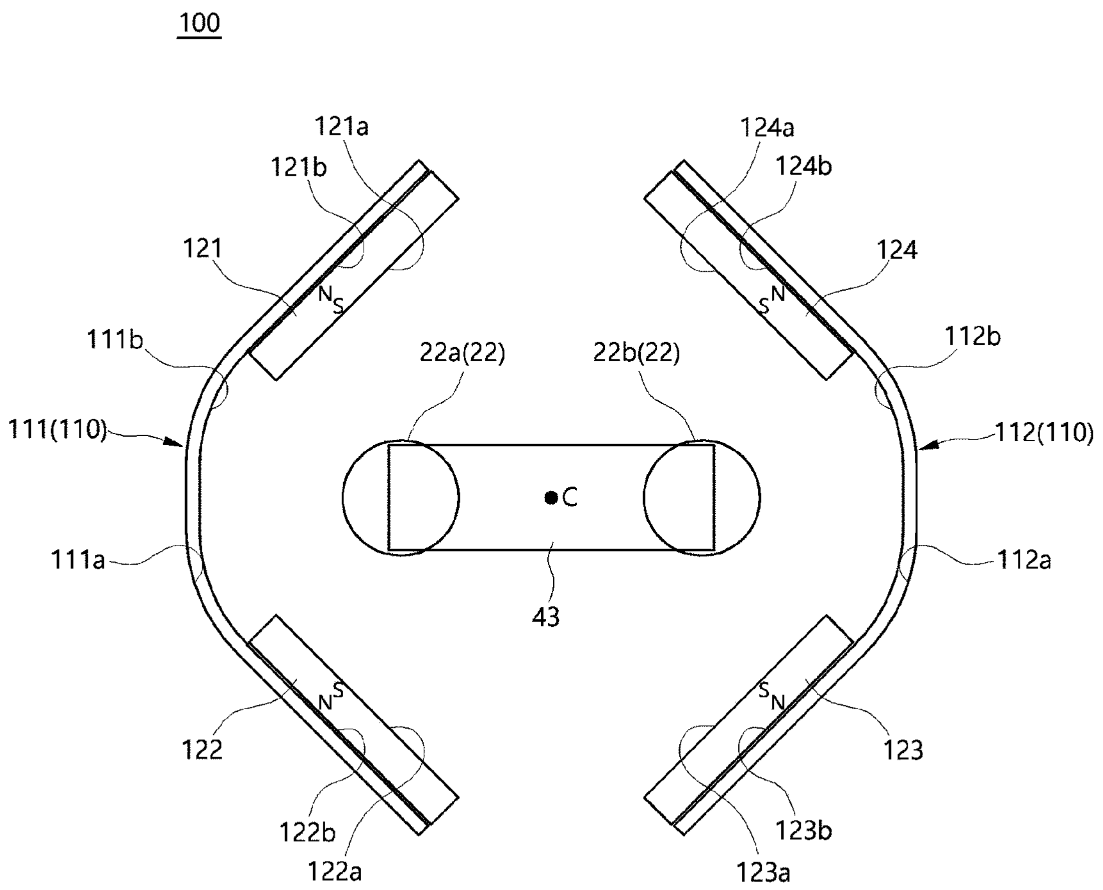
FIG. 6 is a conceptual diagram illustrating another example of a magnet unit provided in the arc path formation unit of FIG. 3.
Figure 7:
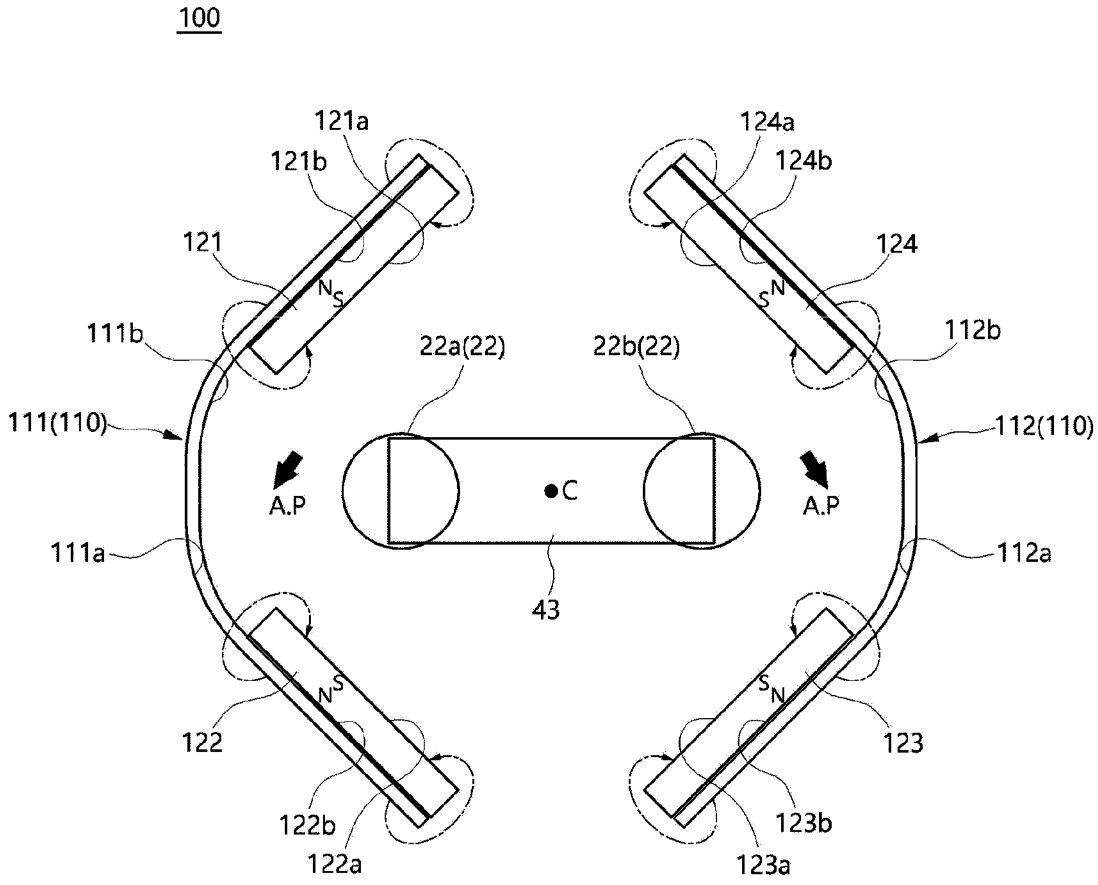
FIGS. 7 to 8 are conceptual diagrams illustrating the magnetic field and arc path formed by the arc path formation unit of FIG. 6.
Figure 8:
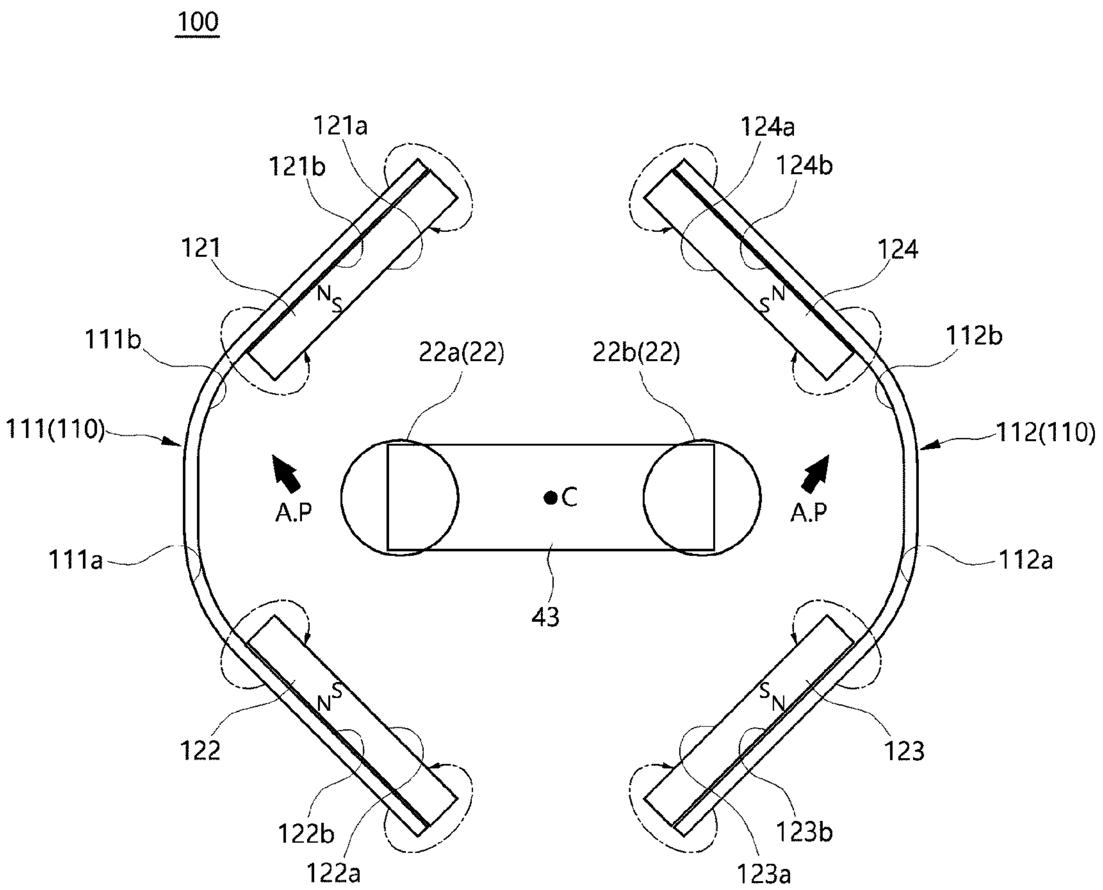

Referring to FIGS. 6 to 8, each of the facing surfaces 121*a*, 122*a*, 123*a*, and 124*a* of the first magnet 121, the second magnet 122, the third magnet 123, and the fourth magnet 124 is all magnetized to the S pole, and each of the opposite surfaces 121*b*, 122*b*, 123*b*, and 124*b* is all magnetized to the N pole. Accordingly, a magnetic field in a direction of pushing each other is formed between the first magnet 121, the second magnet 122, the third magnet 123, and the fourth magnet 124.

In addition, the first holder 111 and the second holder 112 are also magnetized together by the magnet unit 120 to form an additional magnetic field.

In the embodiment illustrated in FIG. 7, the direction of the electric current is a direction from the second fixed contact 22*b* through the movable contact 43 to the first fixed contact 22*a*.

If Fleming's left-hand rule is applied considering the direction of the electric current and the direction of the magnetic field in the first fixed contact 22*a*, the electromagnetic force generated in the vicinity of the first fixed contact 22*a* is formed to face downward and to the left. Accordingly, the arc path A.P in the vicinity of the first fixed contact 22*a* is also formed to face downward and to the left.

Likewise, if Fleming's left-hand rule is applied considering the direction of the electric current and the direction of the magnetic field in the second fixed contact 22*b*, the electromagnetic force generated in the vicinity of the second fixed contact 22*b* is formed to face downward and to the right. Accordingly, the arc path A.P in the vicinity of the second fixed contact 22*b* is also formed to face downward and to the right.

In the embodiment illustrated in FIG. 8, the direction of the electric current is a direction from the first fixed contact 22*a* through the movable contact 43 to the second fixed contact 22*b*.

If Fleming's left-hand rule is applied considering the direction of the electric current and the direction of the magnetic field in the first fixed contact 22*a*, the electromagnetic force generated in the vicinity of the first fixed contact 22*a* is formed to face upward and to the left. Accordingly, the arc path A.P in the vicinity of the first fixed contact 22*a* is formed to face upward and to the left.

Likewise, if Fleming's left-hand rule is applied considering the direction of the electric current and the direction of the magnetic field in the second fixed contact 22*b*, the electromagnetic force generated in the vicinity of the second fixed contact 22*b* is formed to face upward and to the right. Accordingly, the arc path A.P in the vicinity of the second fixed contact 22*b* is also formed to face upward and to the right.

Therefore, the arc path formation unit 100 according to the present embodiment may form the electromagnetic force and the arc path A.P in a direction away from the central portion C, regardless of the polarity of the magnet unit 120 or the direction of the electric current energizing through the direct current relay.

Accordingly, damage to each component of the direct current relay 1 disposed adjacent to the central portion C can be prevented. Furthermore, the generated arc can be quickly discharged to the outside, so that the operation reliability of the direct current relay 1 can be improved.

3. Description of the Arc Path Formation Unit 200 According to Another Embodiment of the Present Disclosure Hereinafter, the arc path formation unit 200 according to another embodiment of the present disclosure will be described with reference to FIGS. 9 to 14.

The arc path formation unit 200 according to the present embodiment includes a magnet holder unit 210, a magnet unit 220, and an auxiliary magnet 230.

The magnet holder unit 210 and the magnet unit 220 according to the present embodiment have the same structure and function as the magnet holder unit 110 and the magnet unit 120 according to the above-described embodiment. However, the arc path formation unit 200 according to the present embodiment differs from the arc path formation unit 100 according to the above-described embodiment in that it includes an auxiliary magnet 230.

Thus, the description of the magnet holder unit 210 and the magnet unit 220 will be replaced by the description of the magnet holder unit 110 and the magnet unit 120 according to the above-described embodiment, and the description will be focused on the auxiliary magnet 230.

The auxiliary magnet 230 forms a magnetic field inside the arc chamber 21 in which the fixed contact 22 and the movable contact 43 are accommodated.

The auxiliary magnet 230 is located radially inside the magnet holder unit 210. That is, the auxiliary magnet 230 is located between the first holder 211 and the second holder 212.

The auxiliary magnet 230 overlaps the central portion C of the fixed contact 22 and the movable contact 43 in a movement direction of the movable contact 43. In the illustrated embodiment, the auxiliary magnet 230 is arranged so that its center corresponds to the central portion C of the fixed contact 22 and the movable contact 43.

The auxiliary magnet 230 may form a magnetic field by itself or in relationship with the magnet unit 220. The magnetic field formed by the auxiliary magnet 230 forms electromagnetic force together with the electric current energizing through the fixed contact 22 and the movable contact 43. The formed electromagnetic force guides an arc generated when the fixed contact 22 and the movable contact 43 are spaced apart.

The auxiliary magnet 230 extends in a direction parallel to the arrangement direction of the first holder 211 and the second holder 212.

In an embodiment, the shortest distance from each of the facing surfaces 221*a*, 222*a*, 223*a*, and 224*a* of the first magnet 221, the second magnet 222, the third magnet 223, and the fourth magnet 224 to the center of the auxiliary magnet 230 may all be formed the same.

In the illustrated embodiment, the auxiliary magnet 230 is formed to have a polarity in the width direction.

The auxiliary magnet 230 includes a first surface 231 and a second surface 232.

The first surface 231 is located on one surface of the auxiliary magnet 230 facing the first magnet 221 and the fourth magnet 224. In addition, the second surface 232 is located on the other surface of the auxiliary magnet 230 opposite to the first surface 231. It will be understood that the first surface 231 and the second surface 232 are formed on different surfaces of one auxiliary magnet 230 and thus are magnetized to opposite polarities each other.

Figure 9:
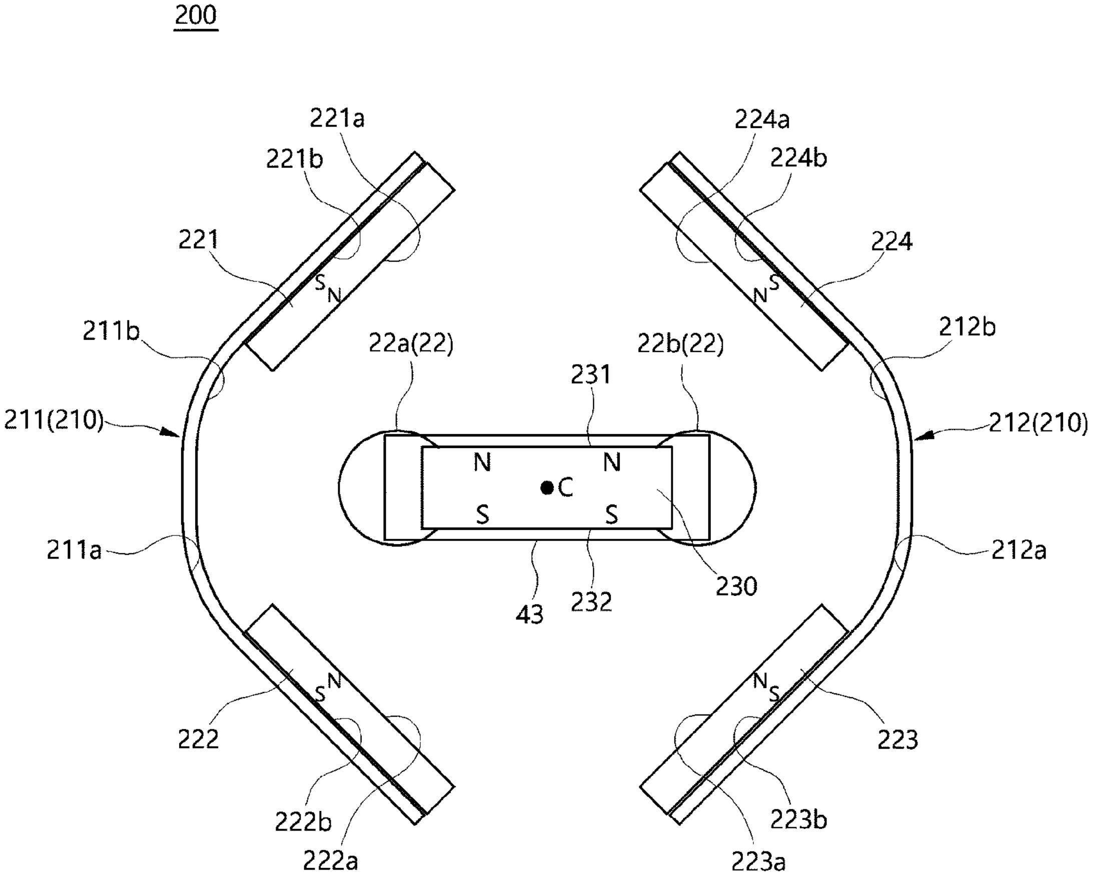
FIG. 9 is a conceptual diagram illustrating an arc path formation unit according to another embodiment of the present disclosure.
Figure 10:
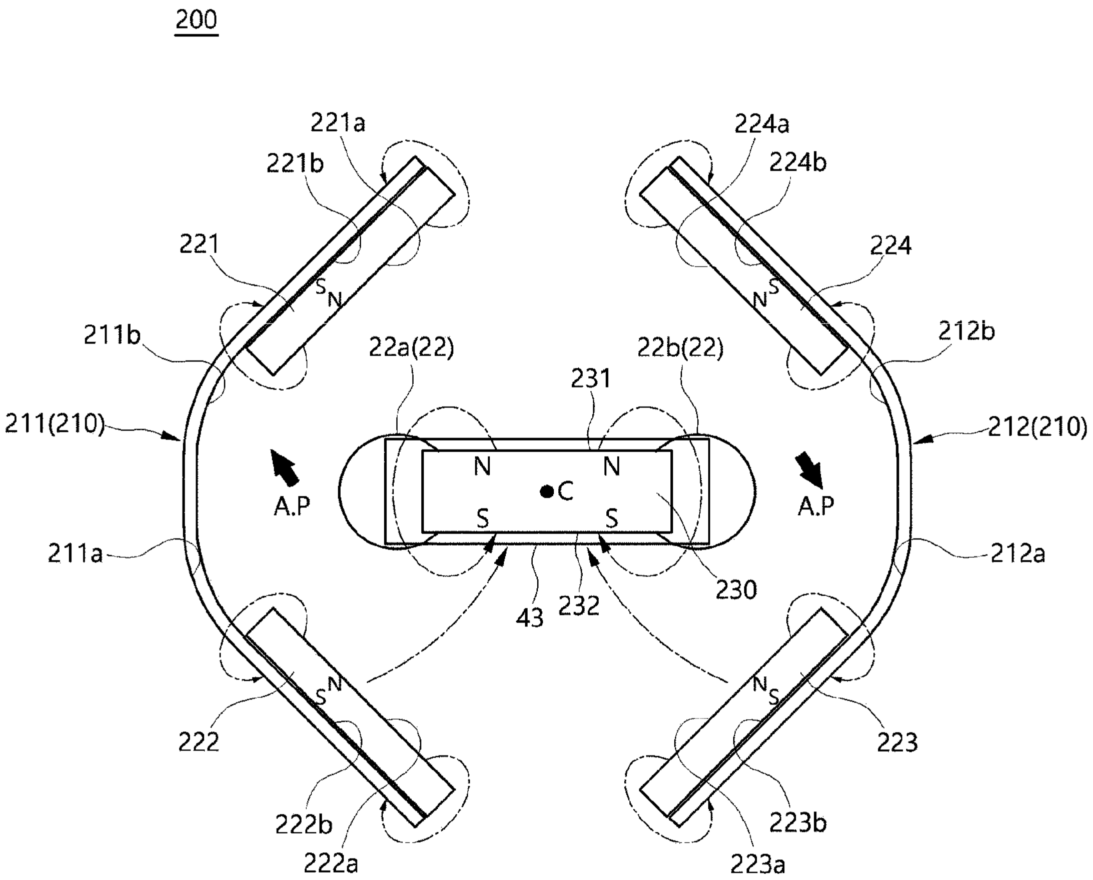
FIGS. 10 to 11 are conceptual diagrams illustrating the magnetic field and arc path formed by the arc path formation unit of FIG. 9.
Figure 11:
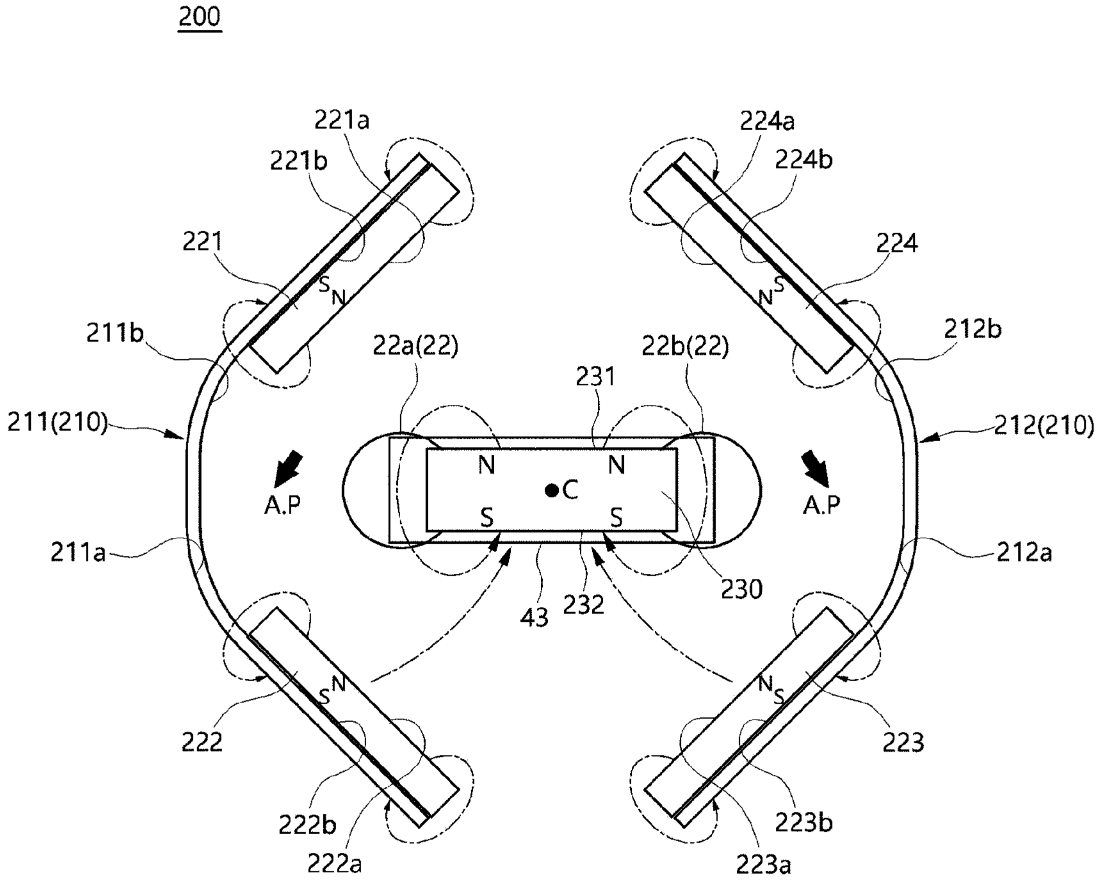

Referring to FIGS. 9 to 11, each of the facing surfaces 221*a*, 222*a*, 223*a*, and 224*a* of the first magnet 221, the second magnet 222, the third magnet 223, and the fourth magnet 224 is all magnetized to the N pole, and each of the opposite surfaces 221*b*, 222*b*, 223*b*, and 224*b* is all magnetized to the S pole. Accordingly, a magnetic field in a direction of pushing each other is formed between the first magnet 221, the second magnet 222, the third magnet 223, and the fourth magnet 224.

In addition, the first surface 231 of the auxiliary magnet 230 is magnetized to the N pole, and the second surface 232 is magnetized to the S pole. Accordingly, a magnetic field in a direction of pushing each other is formed between the first surface 231 of the auxiliary magnet 230, the first facing surface 221*a* of the first magnet 221, and the fourth facing surface 224*a* of the fourth magnet 224. On the contrary, a magnetic field in a direction from the second facing surface 222*a* and the third facing surface 223*a* toward the second surface 232 is formed between the second surface 232 of the auxiliary magnet 230, the second facing surface 222*a* of the second magnet 222, and the third facing surface 223*a* of the third magnet 223.

In addition, the first holder 211 and the second holder 212 are also magnetized together by the magnet unit 220 to form an additional magnetic field.

In the embodiment illustrated in FIG. 10, the direction of the electric current is a direction from the second fixed contact 22*b* through the movable contact 43 to the first fixed contact 22*a*.

If Fleming's left-hand rule is applied considering the direction of the electric current and the direction of the magnetic field in the first fixed contact 22*a*, the electromagnetic force generated in the vicinity of the first fixed contact 22*a* is formed to face upward and to the left. Accordingly, the arc path A.P in the vicinity of the first fixed contact 22*a* is also formed to face upward and to the left.

Likewise, if Fleming's left-hand rule is applied considering the direction of the electric current and the direction of the magnetic field in the second fixed contact 22*b*, the electromagnetic force generated in the vicinity of the second fixed contact 22*b* is formed to face downward and to the right. Accordingly, the arc path A.P in the vicinity of the second fixed contact 22*b* is also formed to face downward and to the right.

In the embodiment illustrated in FIG. 11, the direction of the electric current is a direction from the first fixed contact 22*a* through the movable contact 43 to the second fixed contact 22*b*.

If Fleming's left-hand rule is applied considering the direction of the electric current and the direction of the magnetic field in the first fixed contact 22*a*, the electromagnetic force generated in the vicinity of the first fixed contact 22*a* is formed to face downward and to the left. Accordingly, the arc path A.P in the vicinity of the first fixed contact 22*a* is formed to face downward and to the left.

Likewise, if Fleming's left-hand rule is applied considering the direction of the electric current and the direction of the magnetic field in the second fixed contact 22*b*, the electromagnetic force generated in the vicinity of the second fixed contact 22*b* is formed to face downward and to the right. Accordingly, the arc path A.P in the vicinity of the second fixed contact 22*b* is also formed to face downward and to the right.

Figure 12:
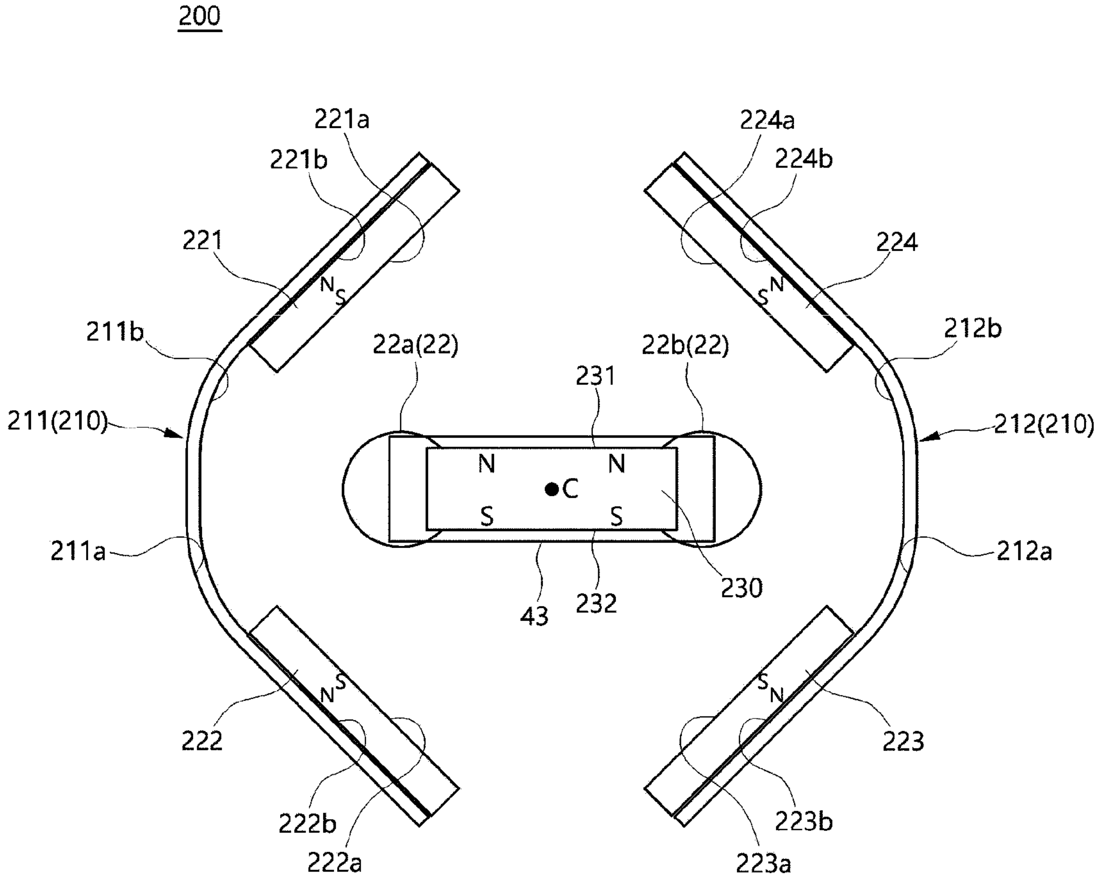
FIG. 12 is a conceptual diagram illustrating another example of a magnet unit provided in the arc path formation unit of FIG. 9.
Figure 13:
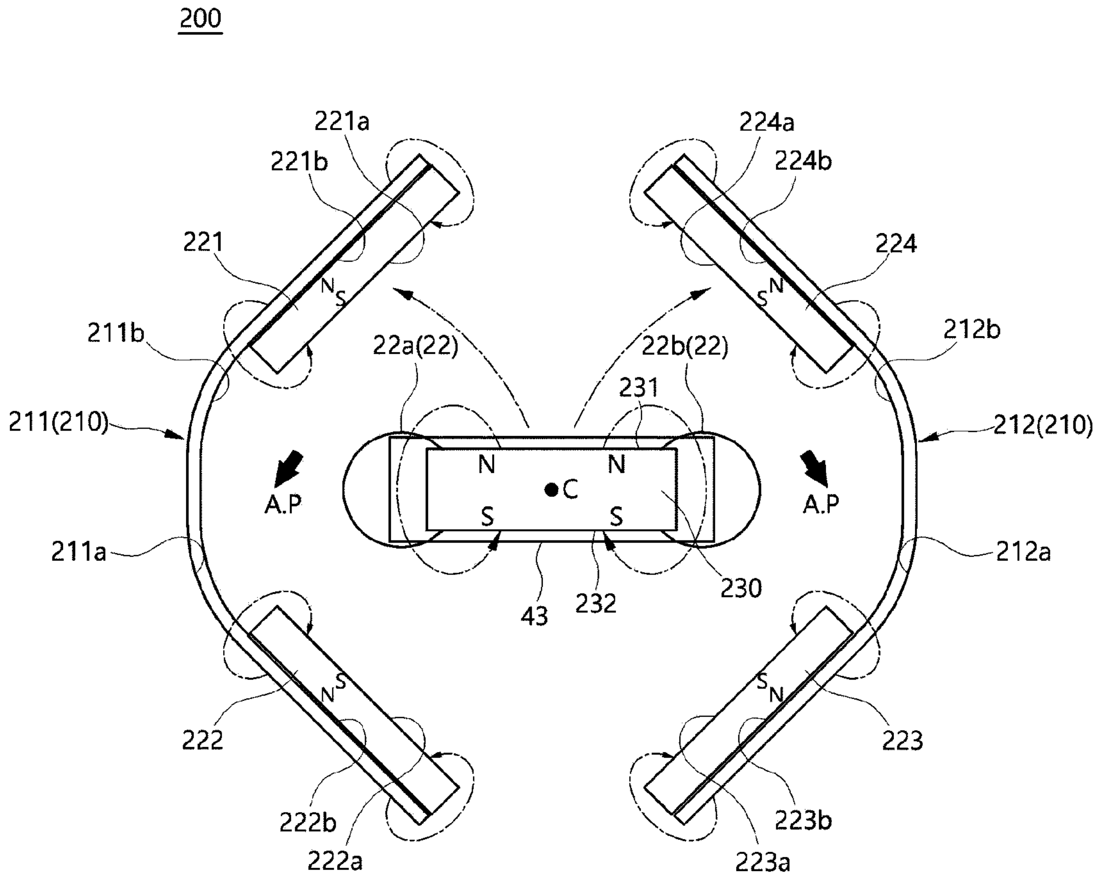
FIGS. 13 to 14 are conceptual diagrams illustrating the magnetic field and arc path formed by the arc path formation unit of FIG. 12.
Figure 14:
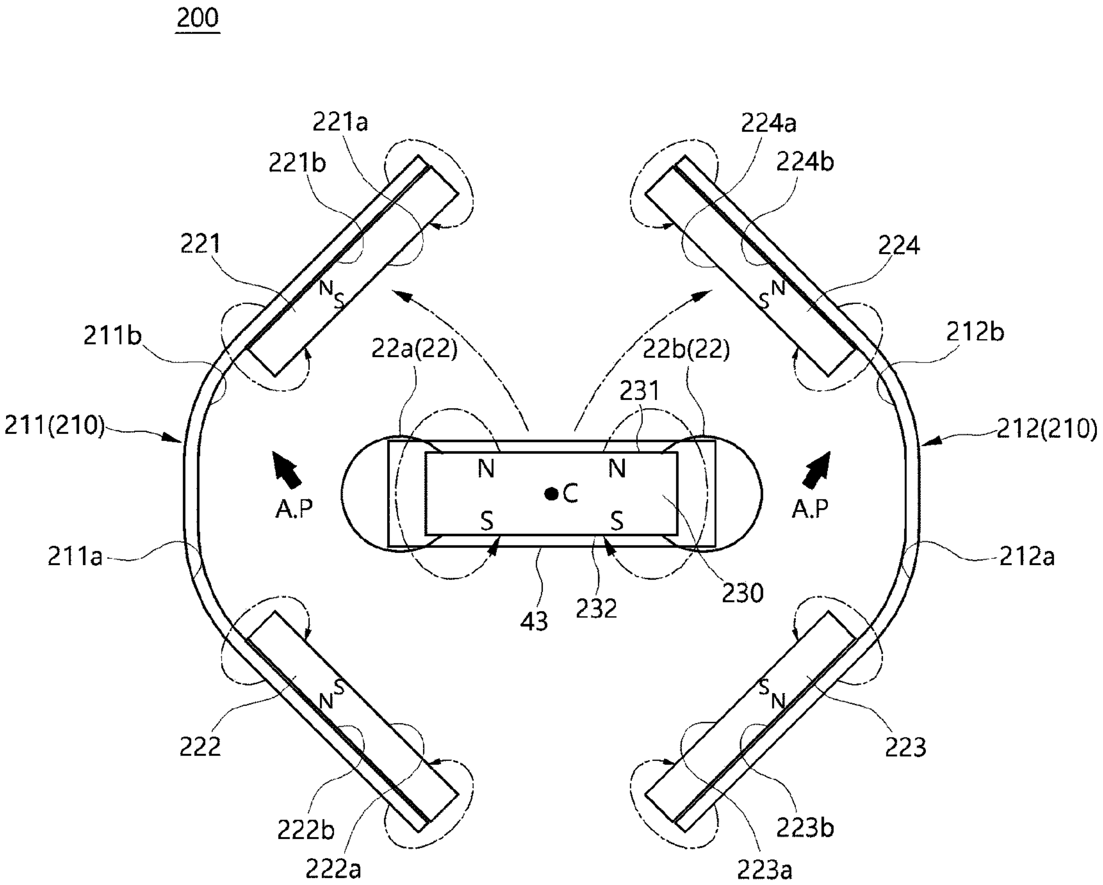

Referring to FIGS. 12 to 14, each of the facing surfaces 221*a*, 222*a*, 223*a*, and 224*a* of the first magnet 221, the second magnet 222, the third magnet 223, and the fourth magnet 224 is all magnetized to the S pole, and each of the opposite surfaces 221*b*, 222*b*, 223*b*, and 224*b* is all magnetized to the N pole. Accordingly, a magnetic field in a direction of pushing each other is formed between the first magnet 221, the second magnet 222, the third magnet 223, and the fourth magnet 224.

In addition, the first surface 231 of the auxiliary magnet 230 is magnetized to the N pole, and the second surface 232 is magnetized to the S pole. Accordingly, a magnetic field in a direction from the first surface 231 toward the first facing surface 221*a* and the fourth facing surface 224*a* is formed between the first surface 231 of the auxiliary magnet 230, the first facing surface 221*a* of the first magnet 221, and the fourth facing surface 224*a* of the fourth magnet 224. On the contrary, a magnetic field in a direction of pushing each other is formed between the second surface 232 of the auxiliary magnet 230, the second facing surface 222*a* of the second magnet 222, and the third facing surface 223*a* of the third magnet 223.

In addition, the first holder 211 and the second holder 212 are also magnetized together by the magnet unit 220 to form an additional magnetic field.

In the embodiment illustrated in FIG. 13, the direction of the electric current is a direction from the second fixed contact 22*b* through the movable contact 43 to the first fixed contact 22*a*.

If Fleming's left-hand rule is applied considering the direction of the electric current and the direction of the magnetic field in the first fixed contact 22*a*, the electromagnetic force generated in the vicinity of the first fixed contact 22*a* is formed to face downward and to the left. Accordingly, the arc path A.P in the vicinity of the first fixed contact 22*a* is also formed to face downward and to the left.

Likewise, if Fleming's left-hand rule is applied considering the direction of the electric current and the direction of the magnetic field in the second fixed contact 22*b*, the electromagnetic force generated in the vicinity of the second fixed contact 22*b* is formed to face downward and to the right. Accordingly, the arc path A.P in the vicinity of the second fixed contact 22*b* is also formed to face downward and to the right.

In the embodiment illustrated in FIG. 14, the direction of the electric current is a direction from the first fixed contact 22*a* through the movable contact 43 to the second fixed contact 22*b*.

If Fleming's left-hand rule is applied considering the direction of the electric current and the direction of the magnetic field in the first fixed contact 22*a*, the electromagnetic force generated in the vicinity of the first fixed contact 22*a* is formed to face upward and to the left. Accordingly, the arc path A.P in the vicinity of the first fixed contact 22*a* is formed to face upward and to the left.

Likewise, if Fleming's left-hand rule is applied considering the direction of the electric current and the direction of the magnetic field in the second fixed contact 22*b*, the electromagnetic force generated in the vicinity of the second fixed contact 22*b* is formed to face upward and to the right. Accordingly, the arc path A.P in the vicinity of the second fixed contact 22*b* is also formed to face upward and to the right.

Therefore, the arc path formation unit 200 according to the present embodiment may form the electromagnetic force and the arc path A.P in a direction away from the central portion C, regardless of the polarity of the magnet unit 220 or the direction of the electric current energizing through the direct current relay.

Accordingly, damage to each component of the direct current relay 1 disposed adjacent to the central portion C can be prevented. Furthermore, the generated arc can be quickly discharged to the outside, so that the operation reliability of the direct current relay 1 can be improved.

4. Description of the Arc Path Formation Unit 300 According to Vet Another Embodiment of the Present Disclosure Hereinafter, the arc path formation unit 300 according to yet another embodiment of the present disclosure will be described with reference to FIGS. 15 to 20.

The arc path formation unit 300 according to the present embodiment includes a magnet holder unit 310, a magnet unit 320, and an auxiliary magnet 330.

The magnet holder unit 310 and the magnet unit 320 according to the present embodiment have the same structure and function as the magnet holder unit 210 and the magnet unit 220 according to the above-described embodiment. However, the auxiliary magnet 330 according to the present embodiment differs from the auxiliary magnet 230 according to the above-described embodiment in that its extension direction intersects the arrangement direction of the first holder 311 and the second holder 312.

Thus, the description of the magnet holder unit 310 and the magnet unit 320 will be replaced by the description of the magnet holder unit 210 and the magnet unit 220 according to the above-described embodiment, and the auxiliary magnet 330 will be described focusing on a difference from the auxiliary magnet 230 according to the above-described embodiment.

The auxiliary magnet 330 according to the present embodiment is located radially inside the magnet holder unit 310. That is, the auxiliary magnet 330 is located between the first holder 311 and the second holder 312. In this case, the auxiliary magnet 330 extends in a direction intersecting the arrangement direction of the first holder 311 and the second holder 312.

In the illustrated embodiment, the auxiliary magnet 330 is formed to have a polarity in the width direction.

The auxiliary magnet 330 includes a first surface 331 and a second surface 332.

The first surface 331 is located on one surface of the auxiliary magnet 330 facing the first magnet 321 and the second magnet 322. In addition, the second surface 332 is located on the other surface of the auxiliary magnet 330 opposite to the first surface 331. It will be understood that the first surface 331 and the second surface 332 are formed on different surfaces of one auxiliary magnet 330 and thus are magnetized to opposite polarities each other.

Figure 15:
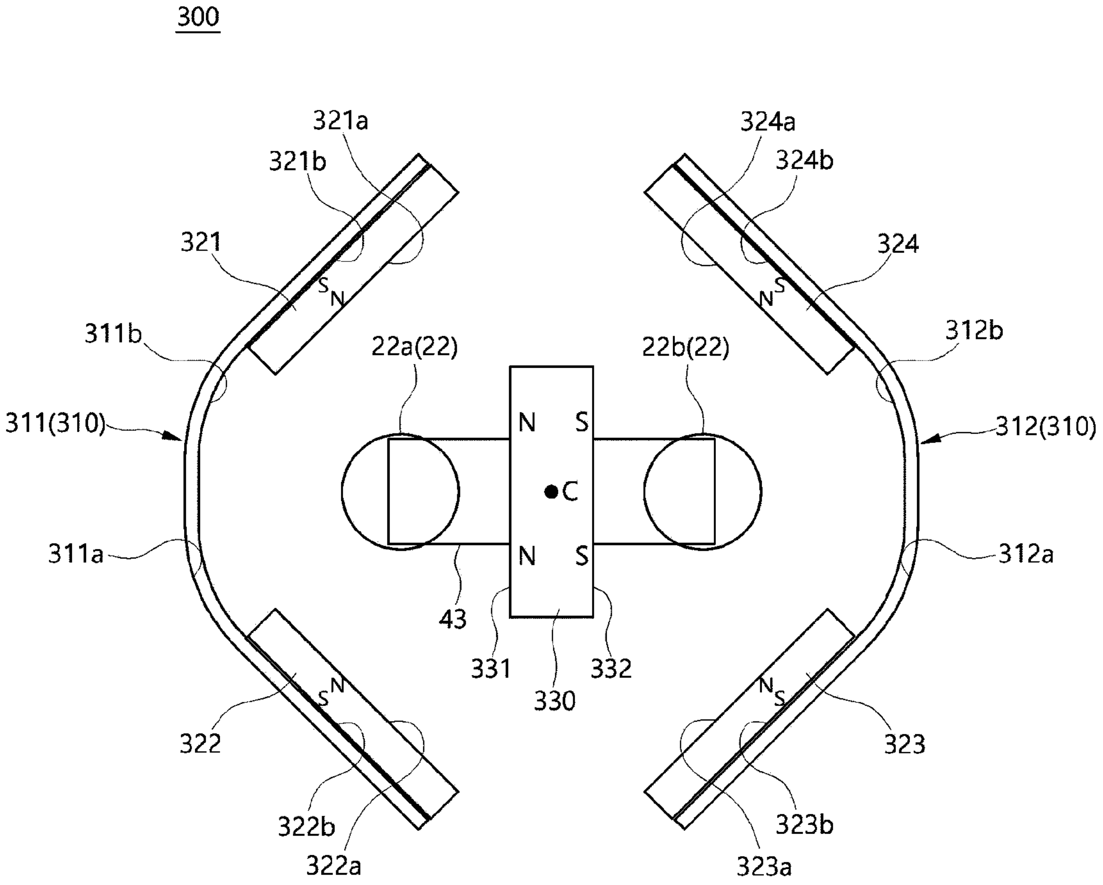
FIG. 15 is a conceptual diagram illustrating an arc path formation unit according to yet another embodiment of the present disclosure.
Figure 16:
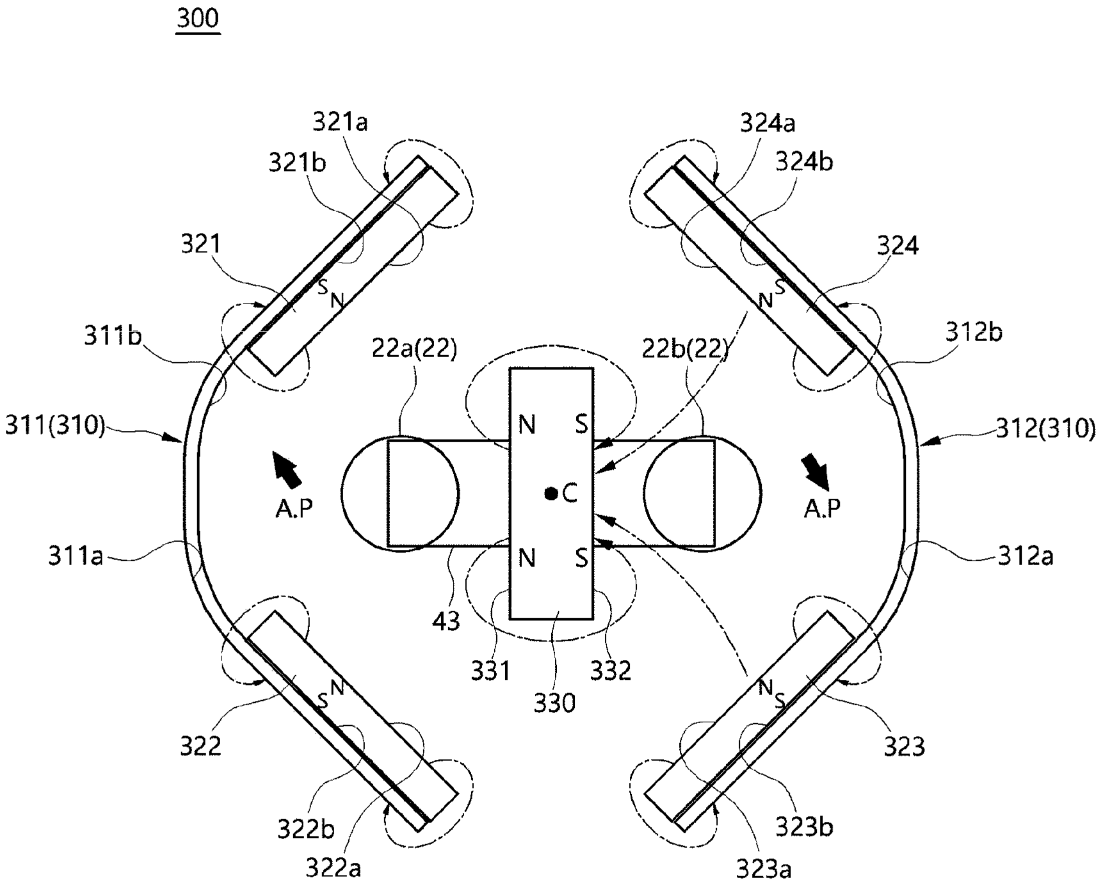
FIGS. 16 to 17 are conceptual diagrams illustrating the magnetic field and arc path formed by the arc path formation unit of FIG. 15.
Figure 17:
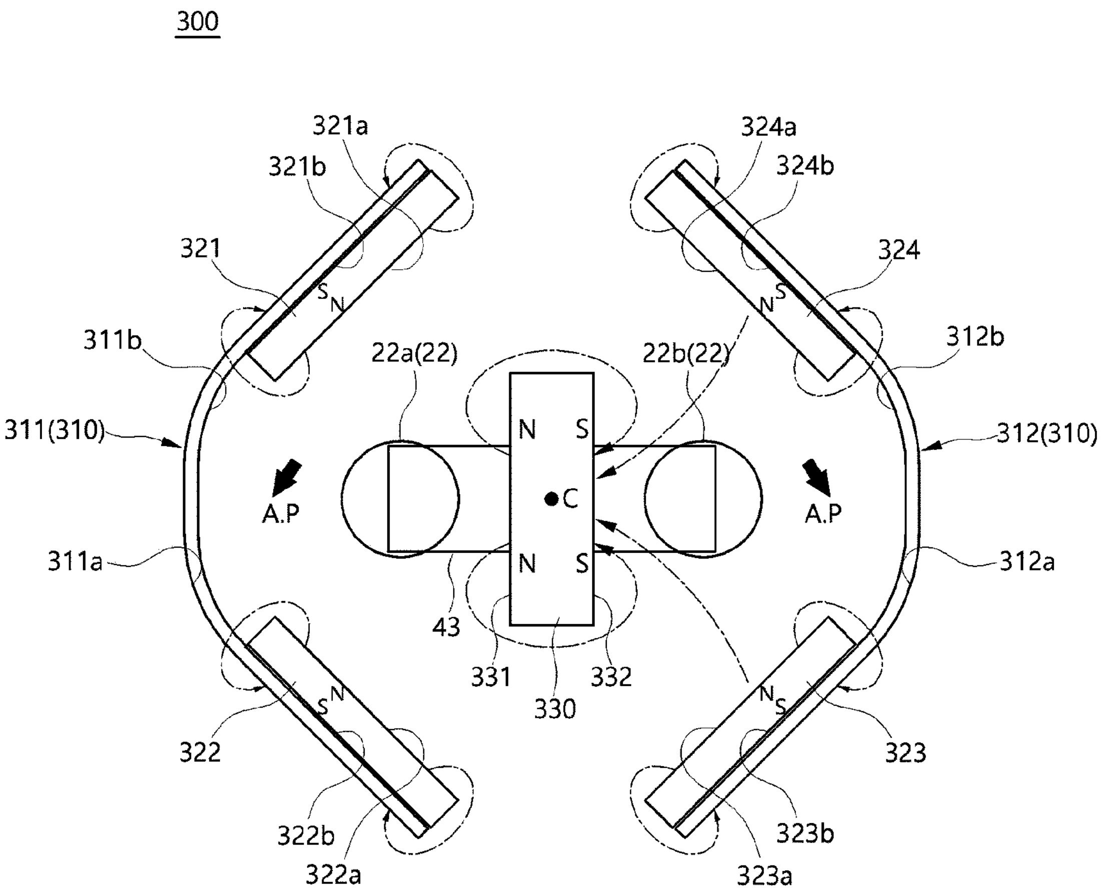

Referring to FIGS. 15 to 17, each of the facing surfaces 321*a*, 322*a*, 323*a*, and 324*a* of the first magnet 321, the second magnet 322, the third magnet 323, and the fourth magnet 324 is all magnetized to the N pole, and each of the opposite surfaces 321*b*, 322*b*, 323*b*, and 324*b* is all magnetized to the S pole. Accordingly, a magnetic field in a direction of pushing each other is formed between the first magnet 321, the second magnet 322, the third magnet 323, and the fourth magnet 324.

In addition, the first surface 331 of the auxiliary magnet 330 is magnetized to the N pole, and the second surface 332 is magnetized to the S pole. Accordingly, a magnetic field in a direction of pushing each other is formed between the first surface 331 of the auxiliary magnet 330, the first facing surface 321*a* of the first magnet 321, and the second facing surface 322*a* of the second magnet 322. On the contrary, a magnetic field in a direction from the third facing surface 323*a* and the fourth facing surface 324*a* toward the second surface 332 is formed between the second surface 332 of the auxiliary magnet 330, the third facing surface 323*a* of the third magnet 323, and the fourth facing surface 324*a* of the fourth magnet 324.

In addition, the first holder 311 and the second holder 312 are also magnetized together by the magnet unit 320 to form an additional magnetic field.

In the embodiment illustrated in FIG. 16, the direction of the electric current is a direction from the second fixed contact 22*b* through the movable contact 43 to the first fixed contact 22*a*.

If Fleming's left-hand rule is applied considering the direction of the electric current and the direction of the magnetic field in the first fixed contact 22*a*, the electromagnetic force generated in the vicinity of the first fixed contact 22*a* is formed to face upward and to the left. Accordingly, the arc path A.P in the vicinity of the first fixed contact 22*a* is also formed to face upward and to the left.

Likewise, if Fleming's left-hand rule is applied considering the direction of the electric current and the direction of the magnetic field in the second fixed contact 22*b*, the electromagnetic force generated in the vicinity of the second fixed contact 22*b* is formed to face downward and to the right. Accordingly, the arc path A.P in the vicinity of the second fixed contact 22*b* is also formed to face downward and to the right.

In the embodiment illustrated in FIG. 17, the direction of the electric current is a direction from the first fixed contact 22*a* through the movable contact 43 to the second fixed contact 22*b*.

If Fleming's left-hand rule is applied considering the direction of the electric current and the direction of the magnetic field in the first fixed contact 22*a*, the electromagnetic force generated in the vicinity of the first fixed contact

22*a* is formed to face downward and to the left. Accordingly, the arc path A.P in the vicinity of the first fixed contact 22*a* is formed to face downward and to the left.

Likewise, if Fleming's left-hand rule is applied considering the direction of the electric current and the direction of the magnetic field in the second fixed contact 22*b*, the electromagnetic force generated in the vicinity of the second fixed contact 22*b* is formed to face downward and to the right. Accordingly, the arc path A.P in the vicinity of the second fixed contact 22*b* is also formed to face downward and to the right.

Figure 18:
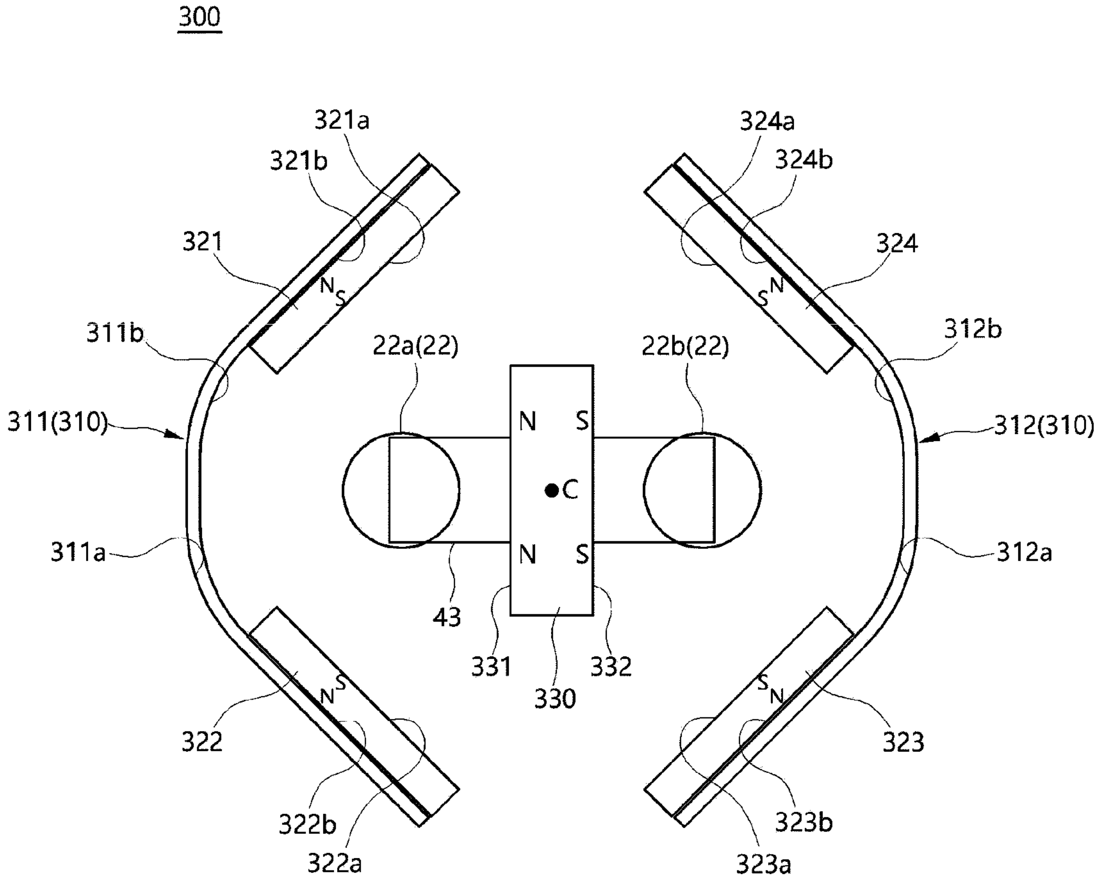
FIG. 18 is a conceptual diagram illustrating another example of a magnet unit provided in the arc path formation unit of FIG. 15.
Figure 19:
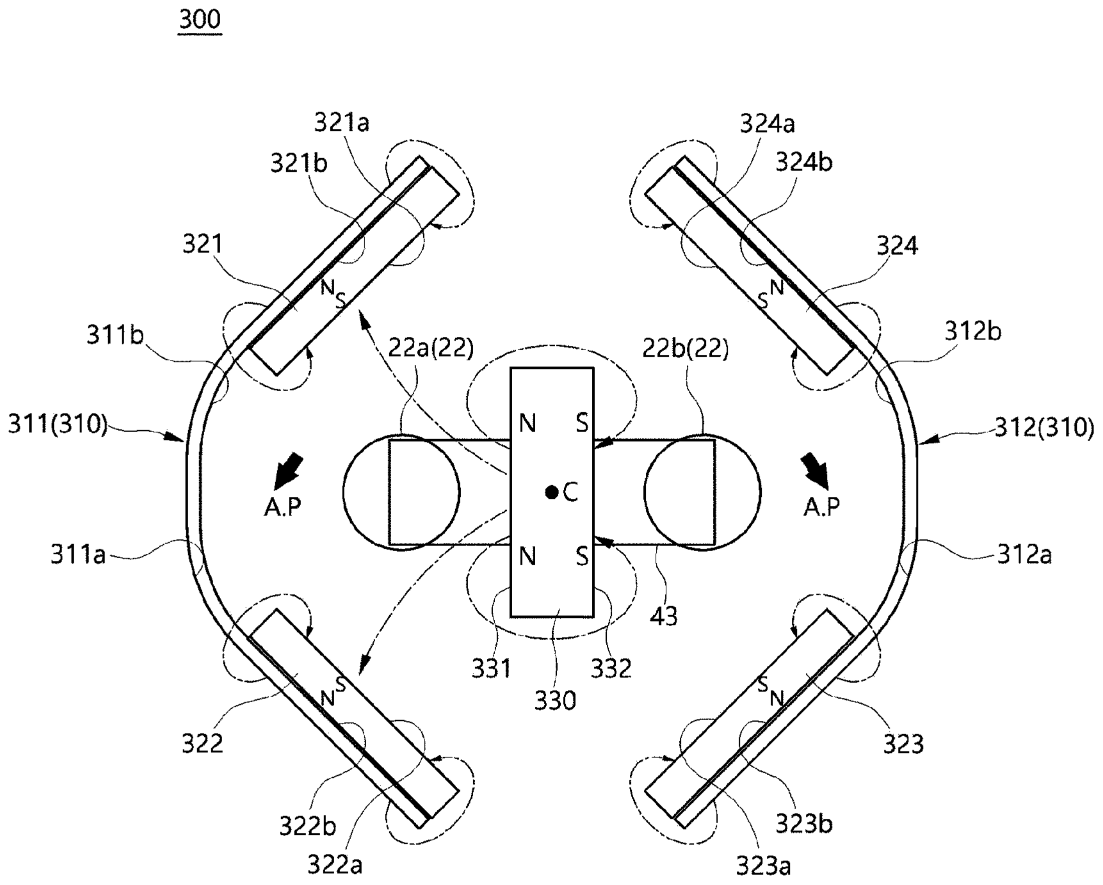
FIGS. 19 to 20 are conceptual diagrams illustrating the magnetic field and arc path formed by the arc path formation unit of FIG. 18.
Figure 20:
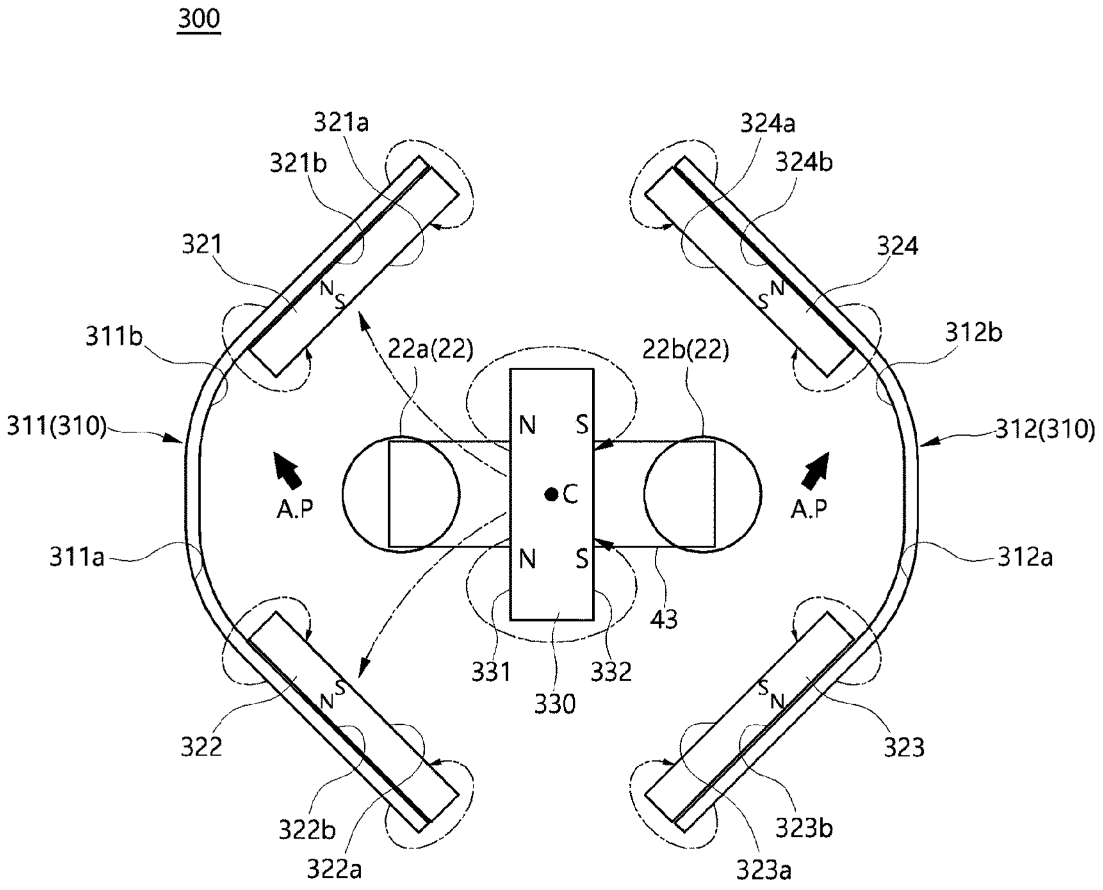

Referring to FIGS. 18 to 20, each of the facing surfaces 321*a*, 322*a*, 323*a*, and 324*a* of the first magnet 321, the second magnet 322, the third magnet 323, and the fourth magnet 324 is all magnetized to the S pole, and each of the opposite surfaces 321*b*, 322*b*, 323*b*, and 324*b* is all magnetized to the N pole. Accordingly, a magnetic field in a direction of pushing each other is formed between the first magnet 321, the second magnet 322, the third magnet 323, and the fourth magnet 324.

In addition, the first surface 331 of the auxiliary magnet 330 is magnetized to the N pole, and the second surface 332 is magnetized to the S pole. Accordingly, a magnetic field in a direction from the first surface 331 toward the first facing surface 321*a* and the second facing surface 322*a* is formed between the first surface 331 of the auxiliary magnet 330, the first facing surface 321*a* of the first magnet 321, and the second facing surface 322*a* of the second magnet 322. On the contrary, a magnetic field in a direction of pushing each other is formed between the second surface 332 of the auxiliary magnet 330, the third facing surface 323*a* of the third magnet 323, and the fourth facing surface 324*a* of the fourth magnet 324.

In addition, the first holder 311 and the second holder 312 are also magnetized together by the magnet unit 320 to form an additional magnetic field.

In the embodiment illustrated in FIG. 19, the direction of the electric current is a direction from the second fixed contact 22*b* through the movable contact 43 to the first fixed contact 22*a*.

If Fleming's left-hand rule is applied considering the direction of the electric current and the direction of the magnetic field in the first fixed contact 22*a*, the electromagnetic force generated in the vicinity of the first fixed contact 22*a* is formed to face downward and to the left. Accordingly, the arc path A.P in the vicinity of the first fixed contact 22*a* is also formed to face downward and to the left.

Likewise, if Fleming's left-hand rule is applied considering the direction of the electric current and the direction of the magnetic field in the second fixed contact 22*b*, the electromagnetic force generated in the vicinity of the second fixed contact 22*b* is formed to face downward and to the right. Accordingly, the arc path A.P in the vicinity of the second fixed contact 22*b* is also formed to face downward and to the right.

In the embodiment illustrated in FIG. 20, the direction of the electric current is a direction from the first fixed contact 22*a* through the movable contact 43 to the second fixed contact 22*b*.

If Fleming's left-hand rule is applied considering the direction of the electric current and the direction of the magnetic field in the first fixed contact 22*a*, the electromagnetic force generated in the vicinity of the first fixed contact 22*a* is formed to face upward and to the left. Accordingly, the arc path A.P in the vicinity of the first fixed contact 22*a* is formed to face upward and to the left.

Likewise, if Fleming's left-hand rule is applied considering the direction of the electric current and the direction of the magnetic field in the second fixed contact 22*b*, the electromagnetic force generated in the vicinity of the second fixed contact 22*b* is formed to face upward and to the right. Accordingly, the arc path A.P in the vicinity of the second fixed contact 22*b* is also formed to face upward and to the right.

Therefore, the arc path formation unit 300 according to the present embodiment may form the electromagnetic force and the arc path A.P in a direction away from the central portion C, regardless of the polarity of the magnet unit 320 or the direction of the electric current energizing through the direct current relay.

Accordingly, damage to each component of the direct current relay 1 disposed adjacent to the central portion C can be prevented. Furthermore, the generated arc can be quickly discharged to the outside, so that the operation reliability of the direct current relay 1 can be improved.

Although the present disclosure has been described above with reference to preferred exemplary embodiments thereof, the present disclosure is not limited to the configurations of the above-described embodiments.

In addition, the present disclosure may be variously modified and changed without departing from the idea and scope of the present disclosure described in the following claims by those skilled in the art to which the present disclosure pertains.

Furthermore, the embodiments may be configured by selectively combining all or some of the embodiments so that various modifications may be made thereto.

DESCRIPTION OF SYMBOLS

1: direct current relay
10: frame unit
11: upper frame
12: lower frame
13: insulating plate
14: support plate
20: switch unit
21: arc chamber
22: fixed contact
22*a*: first fixed contact
22*b*: second fixed contact
30: core unit
31: stationary core
32: movable core
33: yoke
34: bobbin
35: coil
36: return spring
37: cylinder
40: movable contact unit
41: housing
42: cover
43: movable contact
44: shaft
45: elastic portion
100: an embodiment of arc path formation unit
110: magnet holder unit
111: first holder
111*a*: first outer surface
111*b*: first inner surface
112: second holder
112*a*: second outer surface
112*b*: second inner surface

120: magnet unit
121: first magnet
**121*a***: first facing surface
**121*b***: first opposite surface
122: second magnet
**122*a***: second facing surface
**122*b***: second opposite surface
123: third magnet
**123*a***: third facing surface
**123*b***: third opposite surface
124: fourth magnet
**124*a***: fourth facing surface
**124*b***: fourth opposite surface
200: another embodiment of arc path formation unit
210: magnet holder unit
211: first holder
**211*a***: first outer surface
**211*b***: first inner surface
212: second holder
**212*a***: second outer surface
**212*b***: second inner surface
220: magnet unit
221: first magnet
**221*a***: first facing surface
**221*b***: first opposite surface
222: second magnet
**222*a***: second facing surface
**222*b***: second opposite surface
223: third magnet
**223*a***: third facing surface
**223*b***: third opposite surface
224: fourth magnet
**224*a***: fourth facing surface
**224*b***: fourth opposite surface
230: auxiliary magnet
231: first surface
232: second surface
300: yet another embodiment of arc path formation unit
310: magnet holder unit
311: first holder
**311*a***: first outer surface
**311*b***: first inner surface
312: second holder
**312*a***: second outer surface
**312*b***: second inner surface
320: magnet unit
321: first magnet
**321*a***: first facing surface
**321*b***: first opposite surface
322: second magnet
**322*a***: second facing surface
**322*b***: second opposite surface
323: third magnet
**323*a***: third facing surface
**323*b***: third opposite surface
324: fourth magnet
**324*a***: fourth facing surface
**324*b***: fourth opposite surface
330: auxiliary magnet
331: first surface
332: second surface
A.P: arc path

What is claimed is:

1. An arc path formation unit, comprising:

an arc chamber in which a plurality of fixed contacts and movable contacts are accommodated;

a magnet holder unit disposed outside the arc chamber and comprising a first holder and a second holder that are different from each other; and a magnet unit attached to one surface of the magnet holder unit facing the arc chamber and forming a magnetic field in the arc chamber, wherein the first holder and the second holder are each bent and extended at a predetermined angle, are spaced apart from each other and are arranged in a direction parallel to the arrangement direction of the plurality of fixed contacts, and are arranged such that their respective concave portions face each other, wherein the magnet unit comprises:

a first magnet and a second magnet disposed adjacent to one surface of the first holder facing the arc chamber and extending from one end or the other end of the first holder along the one surface of the first holder; and a third magnet and a fourth magnet disposed adjacent to one surface of the second holder facing the arc chamber and extending from one end or the other end of the second holder along the one surface of the second holder, and wherein the first magnet, the second magnet, the third magnet and the fourth magnet are all magnetized with the same polarity.

2. The arc path formation unit of claim 1, wherein in the magnet unit, the first magnet and the third magnet are arranged to face each other, and the second magnet and the fourth magnet are arranged to face each other.

3. The arc path formation unit of claim 2, wherein the first magnet extends in a direction parallel to an extension direction of the third magnet, and the second magnet extends in a direction parallel to an extension direction of the fourth magnet.

4. The arc path formation unit of claim 3, wherein the first magnet and the second magnet have their respective extension directions intersecting each other.

5. The arc path formation unit of claim 2, wherein the first magnet is arranged to face the second magnet each other, with a virtual line extending along the arrangement direction of the fixed contact interposed therebetween, and the third magnet is arranged to face the fourth magnet each other with the virtual line interposed therebetween.

6. The arc path formation unit of claim 5, wherein in the magnet unit, a shortest distance between the first magnet and the second magnet is formed to be equal to a shortest distance between the third magnet and the fourth magnet.

7. The arc path formation unit of claim 1, further comprising:

an auxiliary magnet that overlaps a central point of the plurality of fixed contacts in a movement direction of the movable contact and forms a magnetic field in the arc chamber.

8. The arc path formation unit of claim 7, wherein the auxiliary magnet has an extension direction parallel to the arrangement direction of the first holder and the second holder.

9. The arc path formation unit of claim 7, wherein the auxiliary magnet has an extension direction that intersects the arrangement direction of the first holder and the second holder.

10. The arc path formation unit of claim 1, wherein the first magnet, the second magnet, the third magnet, and the fourth magnet have lengths in the width direction and breadth direction, respectively, corresponding to each other.

11. The arc path formation unit of claim 1, wherein the first holder is formed in a shape corresponding to the second holder, and is symmetrical to the second holder with respect to a central point of the plurality of fixed contacts.

12. A direct current relay, comprising:

a plurality of fixed contacts spaced apart from each other in one direction;

a movable contact that is in contact with or spaced apart from the fixed contact;

an arc chamber in which a space is formed to accommodate the fixed contact and the movable contact;

a frame surrounding the arc chamber;

a magnet holder unit disposed between the outside of the arc chamber and the inside of the frame and comprising a first holder and a second holder that are different from each other; and a magnet unit attached to one surface of the magnet holder unit facing the arc chamber and forming a magnetic field in the arc chamber, wherein the first holder and the second holder are each bent and extended at a predetermined angle, are spaced apart from each other and are arranged in a direction parallel to the arrangement direction of the fixed contact, and are arranged such that their respective concave portions face each other, wherein the magnet unit comprises:

a first magnet and a second magnet disposed adjacent to one surface of the first holder facing the arc chamber and extending from one end or the other end of the first holder along the one surface of the first holder; and a third magnet and a fourth magnet disposed adjacent to one surface of the second holder facing the arc chamber and extending from one end or the other end of the second holder along the one surface of the second holder, and wherein the first magnet, the second magnet, the third magnet and the fourth magnet are all magnetized with the same polarity.

13. The direct current relay of claim 12, wherein in the magnet unit, the first magnet and the third magnet are arranged to face each other, and the second magnet and the fourth magnet are arranged to face each other.

14. The direct current relay of claim 13, wherein the first magnet extends in a direction parallel to an extension direction of the third magnet, and the second magnet extends in a direction parallel to an extension direction of the fourth magnet, and its extension direction intersects the extension direction of the first magnet.

15. The direct current relay of claim 12, wherein the first magnet is arranged to face the second magnet each other, with a virtual line extending along the arrangement direction of the fixed contact interposed therebetween, and the third magnet is arranged to face the fourth magnet each other with the virtual line interposed therebetween.

16. The direct current relay of claim 12, further comprising:

an auxiliary magnet that overlaps a central point of the plurality of fixed contacts in a movement direction of the movable contact and forms a magnetic field in the arc chamber.

17. The direct current relay of claim 16, wherein the auxiliary magnet has an extension direction parallel to the arrangement direction of the first holder and the second holder.

18. The direct current relay of claim 16, wherein the auxiliary magnet has an extension direction that intersects the arrangement direction of the first holder and the second holder.

* * * * *